US012380747B1

(12) United States Patent
Herron et al.

(10) Patent No.: US 12,380,747 B1
(45) **Date of Patent: *Aug. 5, 2025**

(54) VEHICLE DIAGNOSTIC SYSTEM AND METHOD FOR GUIDING VEHICLE SCANNING

(71) Applicant: Opus IVS, Inc., Ann Arbor, MI (US)

(72) Inventors: Brian J. Herron, Dexter, MI (US); Robert A. Augustine, Ventura, CA (US); Michael D. Jurmo, Canton, MI (US); Robert Pattengale, Tucson, AZ (US); Michael B. Devericks, Ventura, CA (US)

(73) Assignee: Opus IVS, Inc., Dexter, MI (US)

( * ) Notice: Subject to any disclaimer, the term of this patent is extended or adjusted under 35 U.S.C. 154(b) by 949 days.

This patent is subject to a terminal disclaimer.

(21) Appl. No.: 17/515,516

(22) Filed: Oct. 31, 2021

Related U.S. Application Data

(63) Continuation-in-part of application No. 17/509,316, filed on Oct. 25, 2021, which is a continuation-in-part
(Continued)

(51) Int. Cl.
*G07C 5/08* (2006.01)

(52) U.S. Cl.
CPC ....... *G07C 5/0808* (2013.01); *G07C 2205/02* (2013.01)

(58) Field of Classification Search
None
See application file for complete search history.

(56) References Cited

U.S. PATENT DOCUMENTS 6,154,658 A 11/2000 Caci
6,728,603 B2 4/2004 Pruzan et al.
(Continued)

FOREIGN PATENT DOCUMENTS

WO 2004092857 A2 10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.
(Continued)

*Primary Examiner* — Abdhesh K Jha
(74) *Attorney, Agent, or Firm* — Gardner, Linn, Burkhart & Ondersma LLP

(57) ABSTRACT

A method and system for guiding selection of a diagnostic scan program for diagnosing an electronic system of a vehicle with a vehicle diagnostic computer tool and a scan evaluation program, where the diagnostic tool includes a display screen and is configured to be connected to a diagnostic port to be in communication with an electronic system of the vehicle and to operate in a mode to diagnose a vehicle. The diagnostic tool receives scan selection inputs and the diagnostic tool generates a recommendation to use either an aftermarket diagnostic scan program or an OE diagnostic scan program based on the scan selection inputs, where the recommendation is displayed on the screen of the diagnostic tool. The vehicle diagnostic computer tool is further configured to enable a user to accept the recommendation to use either the aftermarket or OE diagnostic scan program to diagnose the electronic system of the vehicle.

17 Claims, 10 Drawing Sheets

Related U.S. Application Data of application No. 16/449,998, filed on Jun. 24, 2019, now Pat. No. 11,257,307.

(56) References Cited

U.S. PATENT DOCUMENTS

| | | | | |
|---|---|---|---|---|
| 6,879,894 | B1 | 4/2005 | Lightner et al. | |
| 6,956,501 | B2 | 10/2005 | Kitson | |
| 7,092,803 | B2 | 8/2006 | Kapolka et al. | |
| 7,373,226 | B1 | 5/2008 | Cancilla et al. | |
| 7,502,672 | B1 | 3/2009 | Kolls | |
| 7,519,458 | B2 | 4/2009 | Buckley | |
| 7,532,962 | B1 | 5/2009 | Lowrey et al. | |
| 7,584,030 | B1 | 9/2009 | Graham | |
| 7,786,851 | B2 | 8/2010 | Drew et al. | |
| 7,840,812 | B1 | 11/2010 | Levenberg | |
| 7,928,837 | B2 | 4/2011 | Drew et al. | |
| 8,190,322 | B2 | 5/2012 | Lin et al. | |
| 8,259,936 | B2 | 9/2012 | Mahalingaiah | |
| 8,306,687 | B2 | 11/2012 | Chen | |
| 8,339,254 | B2 | 12/2012 | Drew et al. | |
| 8,352,577 | B2 | 1/2013 | Martone | |
| 8,638,207 | B2 | 1/2014 | Drew et al. | |
| 8,688,313 | B2 | 4/2014 | Margol et al. | |
| 8,909,416 | B2 | 12/2014 | Chen et al. | |
| 8,918,245 | B2 | 12/2014 | Dewhurst et al. | |
| 9,430,884 | B2 | 8/2016 | Drew et al. | |
| 9,530,255 | B2 | 12/2016 | Drew et al. | |
| 9,563,988 | B2 | 2/2017 | Drew et al. | |
| 9,646,130 | B2 | 5/2017 | Drew et al. | |
| 10,013,816 | B2 | 7/2018 | Nassar et al. | |
| 10,146,521 | B2 | 12/2018 | West et al. | |
| 10,181,225 | B2 | 1/2019 | Liebl et al. | |
| 10,282,924 | B2 | 5/2019 | Drew et al. | |
| 10,414,277 | B1 | 9/2019 | Herron et al. | |
| 10,445,953 | B1 | 10/2019 | Herron et al. | |
| 10,706,645 | B1 | 7/2020 | Herron et al. | |
| 10,719,813 | B1 | 7/2020 | Beckmann et al. | |
| 10,748,356 | B1 | 8/2020 | Herron et al. | |
| 11,062,534 | B2 * | 7/2021 | Jingle | G07C 5/0808 |
| 11,210,869 | B2 | 12/2021 | Balan | |
| 2001/0056544 | A1 | 12/2001 | Walker | |
| 2003/0001720 | A1 | 1/2003 | Wade et al. | |
| 2003/0020759 | A1 | 1/2003 | Cancilla et al. | |
| 2004/0044454 | A1 | 3/2004 | Ross et al. | |
| 2004/0167689 | A1 | 8/2004 | Bromley et al. | |
| 2005/0021294 | A1 | 1/2005 | Trsar et al. | |
| 2005/0038581 | A1 | 2/2005 | Kapolka et al. | |
| 2005/0060070 | A1 | 3/2005 | Kapolka et al. | |
| 2005/0182537 | A1 | 8/2005 | Tefft et al. | |
| 2005/0240555 | A1 | 10/2005 | Wilde et al. | |
| 2005/0251304 | A1 | 11/2005 | Cancellara et al. | |
| 2006/0052921 | A1 | 3/2006 | Bodin et al. | |
| 2006/0106508 | A1 | 5/2006 | Liebl et al. | |
| 2006/0211446 | A1 | 9/2006 | Wittmann et al. | |
| 2007/0005201 | A1 | 1/2007 | Chenn | |
| 2007/0043488 | A1 | 2/2007 | Avery et al. | |
| 2007/0050105 | A1 | 3/2007 | Chinnadurai et al. | |
| 2007/0055420 | A1 | 3/2007 | Krzystofczyk et al. | |
| 2007/0073460 | A1 | 3/2007 | Bertosa et al. | |
| 2007/0185624 | A1 | 8/2007 | Duddles et al. | |
| 2007/0204215 | A1 | 8/2007 | Mueller et al. | |
| 2007/0233340 | A1 | 10/2007 | Raichle et al. | |
| 2008/0177438 | A1 | 7/2008 | Chen et al. | |
| 2008/0269975 | A1 | 10/2008 | Bertosa | |
| 2008/0280602 | A1 | 11/2008 | Ban | |
| 2008/0306645 | A1 | 12/2008 | Dewhurst et al. | |
| 2009/0062978 | A1 | 3/2009 | Picard | |
| 2009/0118899 | A1 | 5/2009 | Carlson | |
| 2009/0119657 | A1 | 5/2009 | Link, II | |
| 2009/0187976 | A1 | 7/2009 | Perroud et al. | |
| 2009/0265055 | A1 | 10/2009 | Gillies | |
| 2009/0276115 | A1 | 11/2009 | Chen | |
| 2010/0042287 | A1 | 2/2010 | Zhang | |
| 2010/0174446 | A1 | 7/2010 | Andreasen et al. | |
| 2010/0204878 | A1 | 8/2010 | Drew et al. | |
| 2010/0205450 | A1 | 8/2010 | Samnacke et al. | |
| 2010/0262335 | A1 | 10/2010 | Brozovich | |
| 2011/0071709 | A1 | 3/2011 | Damiani et al. | |
| 2011/0112718 | A1 | 5/2011 | Claus et al. | |
| 2011/0153150 | A1 | 6/2011 | Drew et al. | |
| 2011/0276218 | A1 | 11/2011 | Dwan | |
| 2011/0313593 | A1 | 12/2011 | Cohen et al. | |
| 2012/0046826 | A1 | 2/2012 | Panko | |
| 2012/0254345 | A1 | 10/2012 | Montoya | |
| 2014/0277909 | A1 | 9/2014 | Bertosa et al. | |
| 2014/0279230 | A1 | 9/2014 | Bertosa et al. | |
| 2015/0121275 | A1 | 4/2015 | Marshall et al. | |
| 2017/0301154 | A1 | 10/2017 | Rozint | |

OTHER PUBLICATIONS

Thesis entitled " Remote Connection of Diagnostic Tool" by Irina Elena Apetri and Ali Raza, Chalmers University of Technology, dated 2011.

* cited by examiner

33

Facility Configuration Inputs 33a
- OEM Certified List (Checkbox by Brand)
- Insurance Repair Network List (Checkbox by Insurer)
- Aftermarket Scan Invoice, by Insurer (Yes or No)

Scanning Override Configuration Inputs(user changeable) 33b
- (i) Suggest OEM if OEM Certified for the following:
  - (a) Don't Suggest under any circumstances;
  - (b) Suggest OE-pre if OEM Certified;
  - (c) Suggest OE-Post if OEM Certified;
  - (d) Suggest Both if OEM Certified
- (ii) Suggest OEM if ADAS System Impact:
  - (a) Don't Suggest under any circumstances;
  - (b) Suggest OE-Pre if ADAS Impact;
  - (c) Suggest OE-Post if ADAS Impact;
  - (d) Suggest Both OE if ADAS Impact
- (iii) Suggest OEM if Restraints Deployment:
  - (a) Don't Suggest under any circumstances;
  - (b) Suggest OE-Pre if restraint deployment;
  - (c) Suggest OE-post if restraint deployment;
  - (d) Suggest Both OE if restraint deployment
- (iv) Override: Aftermarket Scan if older than certain year (select model year (and older)):
  - (a) Don't Override under any circumstances;
  - (b) Override: Aftermarket Scan-Pre if older
  - (c) Override: Aftermarket Scan-Post if older;
  - (d) Override Both: Aftermarket Scan if older
- (v) Override: Aftermarket Scan if Aftermarket Scan is 100% supported:
  - (a) Don't override under any circumstances;
  - (b) Override: Aftermarket Scan-Pre if older;
  - (c) Override: Aftermarket Scan if older;
  - (d) Override Both: Aftermarket Scan if older;
  - (e) Override: All but OEM Certified Tree Aftermarket Scan Accuracy Configuration Inputs (Table – List by Year, Make, Mode)l: 33c
- YES/NO: 100% Match on number of DTCs for OE to Aftermarket Scan (historical comparison data)

OEM Position Certification Requirement Configuration Inputs: 33d
- YES/NO: OEM require OE Pre-Scan
- YES/NO: OEM require OE Post-Scan Age Override Configuration Input: 33e
- Select model year (and older)

FIG. 1A

VEHICLE DIAGNOSTIC SYSTEM AND METHOD FOR GUIDING VEHICLE SCANNING

CROSS REFERENCE TO RELATED APPLICATION

The present application is a continuation-in-part of U.S. application Ser. No. 16/449,998, filed on Jun. 24, 2019, and is a continuation-in-part of U.S. application Ser. No. 17/509,316, filed Oct. 25, 2021, both of which are hereby incorporated herein by reference in their entireties.

BACKGROUND OF THE INVENTION

The present invention is directed to a vehicle diagnostic system and method, and in particular to a vehicle diagnostic system that guides a user to select a vehicle diagnostic scanning program for diagnosing a vehicle based on configurable, entered and/or detected parameters.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an OEM or an aftermarket diagnostic company. OEM diagnostic applications may include proprietary diagnostic application software exclusive to a particular OEM, and may be required for certification purposes to validate repairs performed on a vehicle.

SUMMARY OF THE INVENTION

The present invention provides a vehicle diagnostic system and method, and in particular a diagnostic system that utilizes a vehicle diagnostic computer tool to provide a recommendation to a user based on scan selection inputs of whether to use an aftermarket or an original equipment ("OE") diagnostic scan program, and further enables a user of the diagnostic tool to launch the recommended diagnostic scan program to diagnose the electronic system of the vehicle using the diagnostic tool.

In an embodiment of the vehicle diagnostic system, a method for guiding selection of a diagnostic scan program comprises providing a vehicle diagnostic computer tool and a scan evaluation program, where the vehicle diagnostic computer tool includes a display screen and is configured to be connected to a diagnostic port of a vehicle to be in communication with the electronic system of the vehicle and to operate in a mode to diagnose a vehicle. The method further includes providing an aftermarket diagnostic scan program and an OE diagnostic scan program that are both configured for use in diagnosing the electronic system of the vehicle with the vehicle diagnostic computer tool, and includes providing scan selection inputs to the vehicle diagnostic computer tool, and generating a recommendation to use either the aftermarket or the OE diagnostic scan program. The recommendation is displayed on the display screen of the diagnostic evaluation tool and is provided by the scan evaluation program based on the scan selection inputs. The diagnostic tool is further configured to enable a user to accept the recommendation to use either the aftermarket diagnostic scan program or the OE diagnostic scan program.

According to an aspect of the invention, the scan selection inputs include one or more override configuration input parameters that comprise user selectable settings directed to suggesting either the aftermarket or the OE diagnostic scan program under particular conditions, where the user selectable settings are directed to suggesting either the aftermarket or the OE diagnostic scan program under particular conditions for post-scans and/or pre-scans. In a particular arrangement the override configuration input parameters may be directed to at least one of (i) whether the user of the diagnostic tool is OEM certified for repairing the vehicle, (ii) whether there is damage to the vehicle in the location of an Advanced Driver Assistance System (ADAS) system equipped on the vehicle, (iii) whether a vehicle restraint on the vehicle is deployed, (iv) whether the vehicle is older than a preselected model year, and (v) whether the aftermarket scan program is an accurate match to the OE scan program.

In still further configurations, the scan selection inputs comprise facility configuration inputs comprising a designation of original equipment manufacturers ("OEMs") for which a repair facility is certified, restraint deployment inputs comprising a designation of whether or not any vehicle restraints on the vehicle have been deployed, safety system inputs comprising a designation of ADAS systems equipped on the vehicle, damage inputs comprising the location of damage on the vehicle relative to the ADAS systems, a vehicle identification number ("VIN") for the vehicle, a model year for the vehicle, and/or a designation of the accuracy of the aftermarket scan program to the OE scan program.

In a further embodiment of the invention a vehicle diagnostic system for providing a recommended diagnostic scan program for diagnosing an electronic system of a vehicle includes a vehicle diagnostic computer tool having a display screen, where the vehicle diagnostic computer tool is configured to be connected to a diagnostic port of a vehicle to be in communication with the electronic system of the vehicle and to operate in a mode to diagnose a vehicle. The system further includes an aftermarket diagnostic scan program and an OE diagnostic scan program, wherein the diagnostic scan programs are configured for use in diagnosing the electronic system of the vehicle with the vehicle diagnostic computer tool, and includes a scan evaluation program. The vehicle diagnostic computer tool is configured to receive scan selection inputs, with the scan evaluation program configured to display on the display screen a recommendation to use either the aftermarket diagnostic scan program or the OE diagnostic scan program based on the scan selection inputs.

The vehicle diagnostic system and method of the present invention provides a convenient diagnostic tool employing a uniform approach to suggesting use of diagnostic scan programs for use in diagnosing an electronic system of the vehicle, where a user, such as a repair facility, may configure the diagnostic tool to provide suggestions based on various parameters and user selectable settings. These and other objects, advantages, purposes and features of this invention will become apparent upon review of the following specification in conjunction with the drawings.

BRIEF DESCRIPTION OF THE DRAWINGS

FIG. 1A is a detailed listing of configuration inputs illustrated in FIG. 1 as received by diagnostic tool;

DESCRIPTION OF THE PREFERRED EMBODIMENTS

The present invention will now be described with reference to the accompanying figures, wherein the numbered elements in the following written description correspond to like-numbered elements in the figures.

Figure 1:
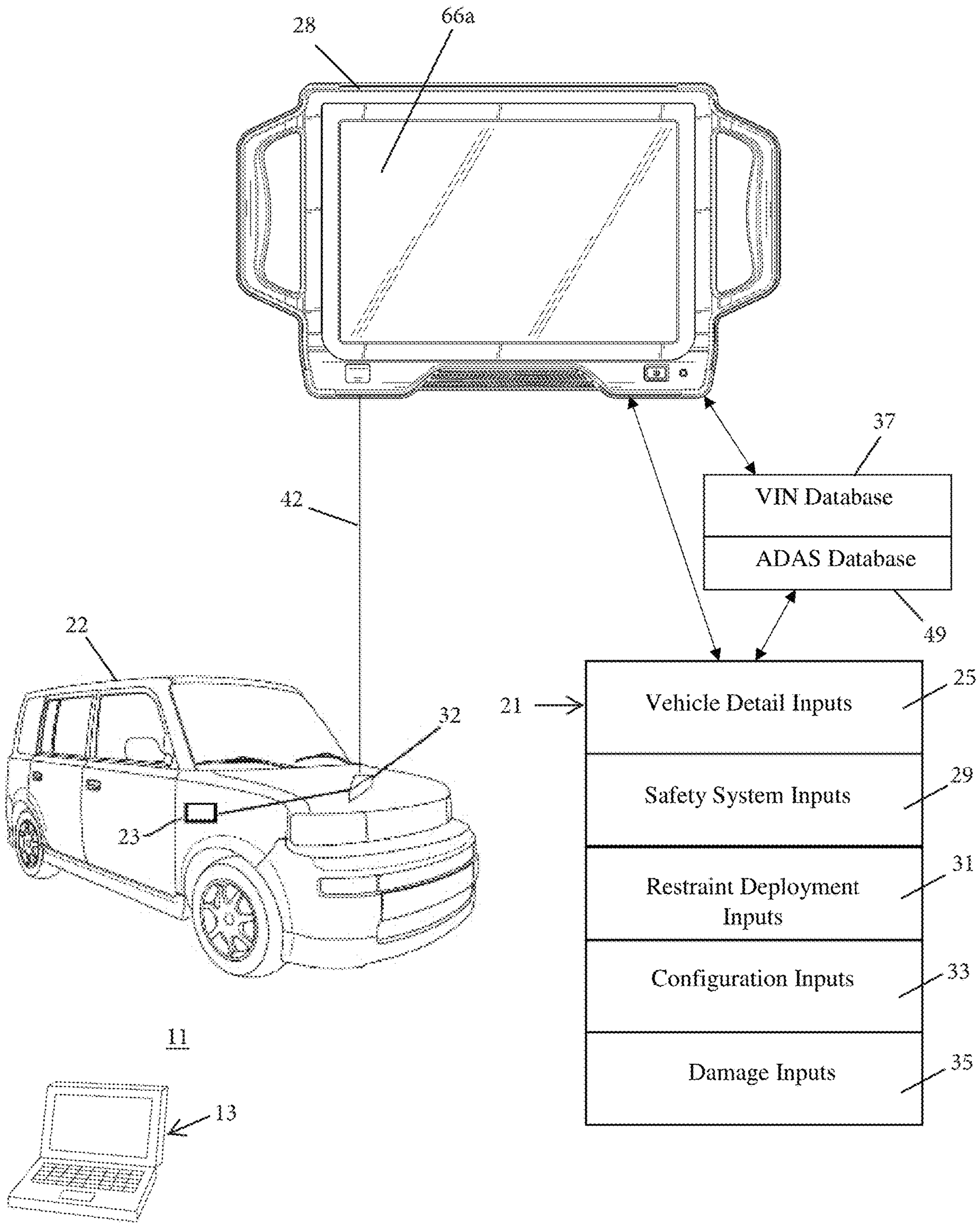
FIG. 1 is a diagram of a vehicle diagnostic system in accordance with the present invention showing a vehicle diagnostic tool connected to the electronic system of a vehicle and illustrating inputs received by the diagnostic tool for guiding selection of a diagnostic scanning program.
Figure 2:
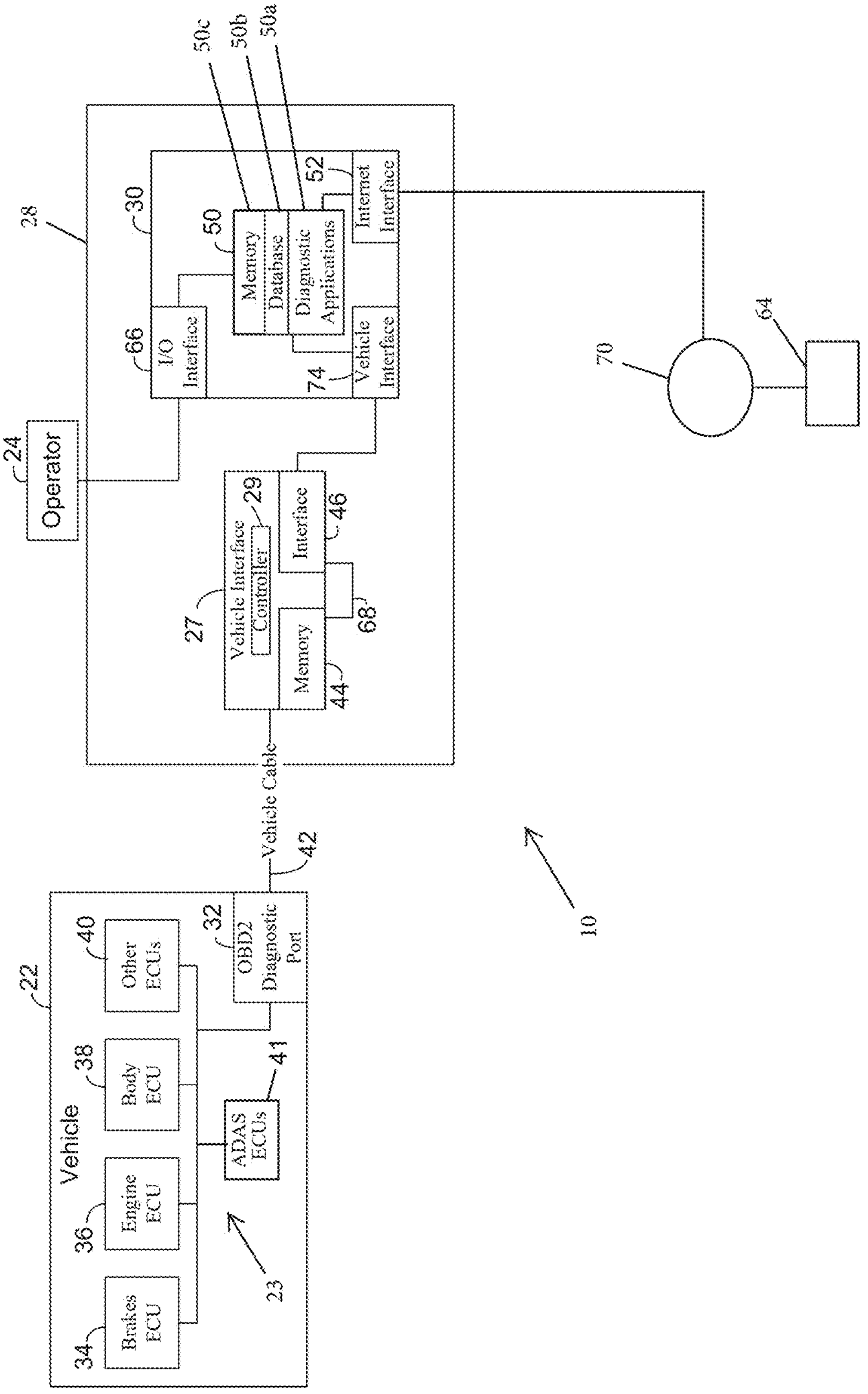
FIG. 2 is a block diagram of the vehicle diagnostic system in accordance with the present invention showing the diagnostic tool in relation to the electronic system of the vehicle.

A vehicle diagnostic system 10 for use with a vehicle 22 is shown for use by a user such as a mechanic or operator 24, such as in an automotive repair facility 11. System 10 is illustrated in FIGS. 1 and 2 as including a vehicle diagnostic tool 28, which as discussed in more detail below, is connected with vehicle 22 by operator 24 in order to diagnose the electronic system 23 of vehicle 22, including various vehicle electronic control units (ECUs), including safety systems such as Adaptive Driver Assistance Systems ("ADAS") ECUs, and including other electronic parts and components of vehicle 22. Vehicle diagnostic tool 28 is used to scan the electronic system 23 of vehicle 22, such as to determine any fault codes in the electronic system 23, which may be reported as diagnostic trouble codes ("DTCs"). A vehicle scan may be run prior to repairs, such as part of an initial diagnosis to provide an indication to the mechanic 24 as to what repairs are needed on vehicle 22, and/or may be run after performing repairs, such as to confirm that vehicle 22 has been properly repaired. As discussed in more detail below, diagnostic tool 28 may be equipped with or configured to access both original equipment ("OE") and aftermarket diagnostic scan programs or applications where, in accordance with the present invention, diagnostic tool 28 includes a scan evaluation program 43 that is responsive to various scan selection inputs 21, such as one or more configurable inputs, entered inputs and/or inputs detected from electronic system 23 of vehicle 22, to guide the selection by a mechanic 24 of a diagnostic scan program to be used on vehicle 22, including as a pre-scan prior to performing repairs or as a post-scan after repairs have been performed.

The selection of which diagnostic scan program to be used on a vehicle is dependent upon a number of factors, including the make, model and/or year of the vehicle. Factors to be considered additionally include the particular systems with which the vehicle is equipped, such as safety systems including ADAS systems, and whether there is damage to the vehicle, and in particular the location of any damage and damage to equipped systems. Additional factors include whether and what certifications the repair facility may hold, such as OE certifications provided by a vehicle manufacturer as being an authorized repair facility for vehicles supplied by the manufacturer, and repair processes and procedures required as part of such certification, as well as mandates by vehicle insurers regarding the processes and procedures required for vehicle repair, including regarding services that are covered by the insurer.

Running an OEM supplied OE diagnostic scan program can require more time and entail greater cost than running an aftermarket diagnostic scan program. For example, an OE diagnostic scanning program may require extensive initialization operations prior to launching, such as confirming updates, as well as require particular processing of the scan output, which adds to the duration required to run an OE scan program. Still further, an OE scan program may operate to perform an in-depth scan regardless of the vehicle configuration, including whether or not the vehicle includes ADAS systems, whereby all possible ECUs for a particular model of a vehicle are routinely queried (or attempted to be queried) by the vehicle diagnostic system 10 whether they are actually in the vehicle 22 or not. Thus, while a proprietary manufacturer supplied scanning program may provide an assurance that all ECUs on a vehicle under test have been queried/scanned and assessed, such scanning programs are often costly, including in terms of requiring a significant length of time to operate as the scanning program methodically queries/scans for each ECU the vehicle may be equipped with, whether or not the vehicle is in fact equipped with any given ECU, as well as having a substantial financial cost as there are monetary charges associated with utilizing the proprietary scanning program, including such as costs for each use or running of the proprietary scanning program, where those costs are greater than compared to an aftermarket scan program.

As discussed in more detail below, diagnostic system 10 utilizing diagnostic tool 28 is thus operable based on inputs to diagnostic tool 28 to guide selection of a diagnostic scan program for use on a given vehicle 22, including whether to use an OE diagnostic scan program or an aftermarket diagnostic scan program as part of a pre-scan prior to repairs or a post-scan after repairs have been performed.

Vehicle diagnostic tool 28 in the illustrated embodiment includes a housing 28*a* containing circuitry, hardware and software, such as a vehicle interface module 27 coupled with a computer module 30. In use, tool 28 is connected with vehicle 22 by operator 24, such as by connecting to an on-board diagnostic ("OBD") diagnostic port 32 of the vehicle 22 in order to diagnose the electronic system 23 of vehicle 22, including the various noted vehicle electronic control units (ECUs), such as an engine ECU 34, body ECU 36, brakes ECU 38, and/or other ECUs 40, including for safety systems such as ADAS ECUs 41, and including other electronic parts and components of vehicle 22. Tool 28 connects with port 32, such as via vehicle cable 42. Vehicle diagnostic tool 28 includes a controller 29, such as in the form of a processor or micro-processor and interface circuitry to facilitate communication between the ECUs and tool 28, with tool 28 including a database of vehicle protocols found in a local memory 44 that allow communication with the ECUs of various makes and models of vehicles.

Vehicle diagnostic tool 28 additionally includes interfaces 46, 71 for communication between interface module 27 and computer module 30, where computer module 30 additionally includes a controller and memory. Diagnostic tool 28 additionally includes a user interface 66, which in the illustrated embodiment comprises a touch screen 66*a* enabling mechanic 24 to enter information into diagnostic tool 28, as well as view information output by diagnostic tool 28. As understood from FIG. 2, vehicle diagnostic tool 28 may be connected to a remote computer, such as a server 64, such as by an Internet 70 connection.

Vehicle diagnostic system 10 may be configured to be selectively operable in one of a plurality of different modes, whereby a technician may use the diagnostic tool 28 for vehicle maintenance, diagnosis, programming and repair as needed. In the illustrated embodiment, and as understood from FIGS. 2 and 3 in accordance with an embodiment of the present invention, system 10 includes or provides access to diagnostic applications 50*a*, such as stored in a memory 50 of diagnostic tool 28, including scan evaluation program 43, a diagnostic evaluation program application 51, and commercially available diagnostic application scanning programs 53*a*, 53*b* that are configured for use with the specific vehicle 22 and may be used or selected by a mechanic 24 via the guidance provided by scan evaluation program 43, as discussed in more detail below, depending on the scan selection inputs 21 based on the configuration of vehicle 22, any damage to vehicle 22, and configured parameters of the repair facility. In the illustrated embodiment diagnostic application program 53*a* comprises an aftermarket scan program and diagnostic application program 53*b* comprises an OE scan program. Although shown as having two diagnostic application programs 53*a*, 53*b*, it should be appreciated that system 20 may include more than two such programs available for use with a given vehicle 22 and/or including additional diagnostic application programs for use with other vehicles, depending on make, model and/or year of a given vehicle. Interface module 27 may be configured as an SAE standard J2534 device, such as a device compliant with the J2534-2 standard, or as an ISO compliant or other standard compliant device for supporting and enabling communication with the electronic systems of a vehicle.

Figure 3:
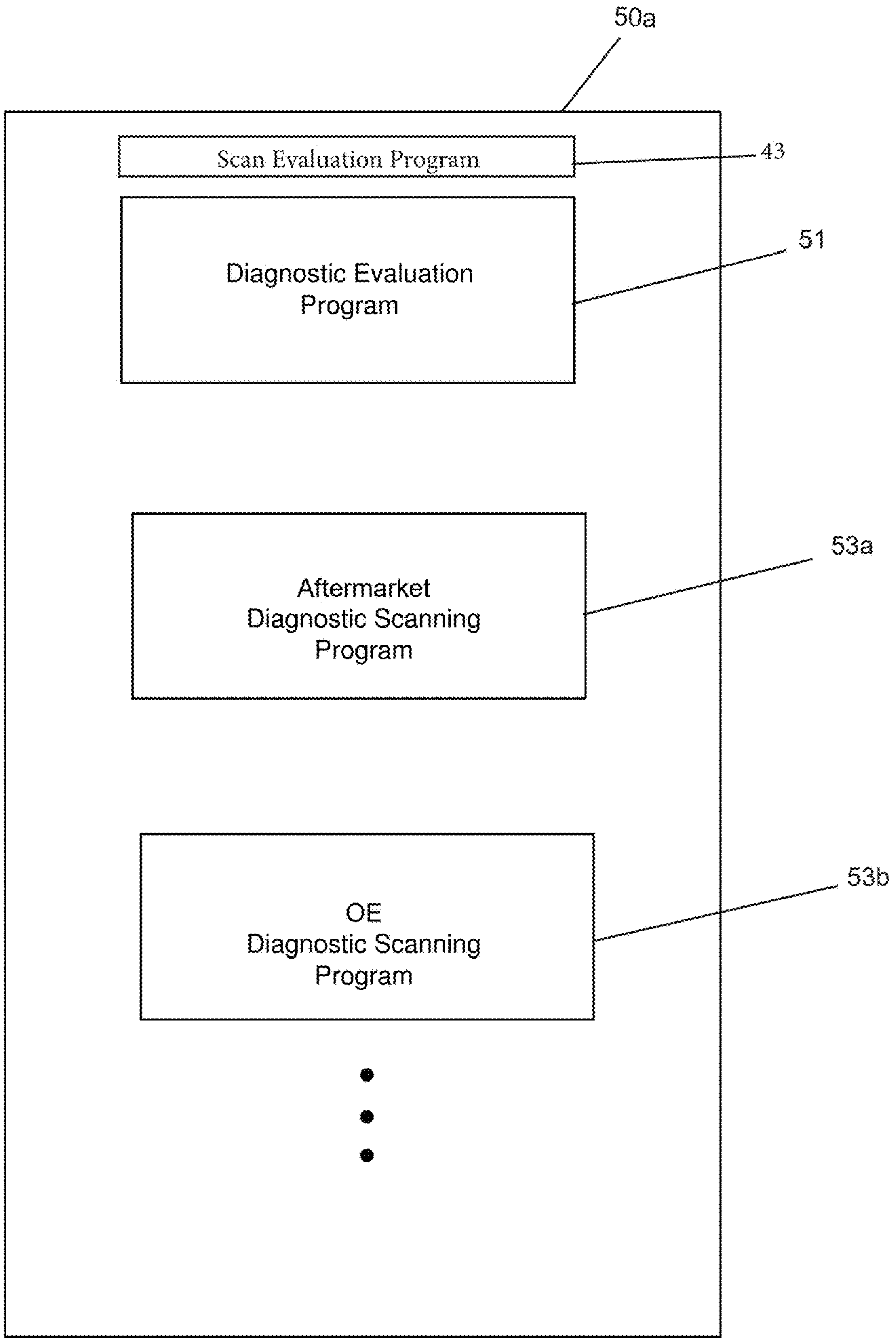
FIG. 3 is a block diagram of programs stored in memory, including a scan evaluation program, diagnostic evaluation program, and diagnostic scanning program applications of the vehicle diagnostic system of FIG. 1.

As illustrated in FIGS. 2 and 3, the diagnostic application scanning programs 53*a*, 53*b* are stored in a memory 50. An exemplary aftermarket diagnostic application scanning program 53*a* comprises a program provided by an automotive manufacturer or a company that supplies diagnostic application programs, such as Snap-On Incorporated, and the OE diagnostic application scanning program 53*b* comprises a program provided by a domestic or foreign OEM, such as Ford, General Motors, Toyota or the like, with the diagnostic application scanning tool 28 configured to enable the reading and reporting of fault codes in the electronic system of the vehicle such as may be located in ECUs of the vehicle. As noted, in practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the vehicle purchaser's selection of vehicle options. Alternatively and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22.

As noted, diagnostic tool 28 receives various inputs to guide selection of a scan program, which as illustrated in FIG. 1 comprise scan selection inputs 21. The scan selection inputs 21 in the illustrated embodiment include vehicle detail inputs 25, vehicle safety system configuration inputs 29, restraint deployment status inputs 31, configurable or configuration inputs 33, and vehicle damage inputs 35.

Vehicle detail inputs 25 may comprise various information, including the make, model and/or year of the vehicle 22. The vehicle detail inputs 25 may further or alternatively include the vehicle identification number ("VIN") of the vehicle 22. The vehicle detail inputs 25 may be manually entered by mechanic into diagnostic tool 28, such as via touch screen 66*a*. Alternatively, vehicle detail inputs 25 may be obtained by diagnostic tool 28 by reading from electronic system 23, where diagnostic tool 28 may query electronic system 23, such as to obtain the VIN. System 10 may further employ a VIN database 37 via which specifics of vehicle 22 may be ascertained by diagnostic tool 28. For example, VIN database 37 may be used to determine the make, model and/or year of vehicle 22 via the VIN. The model year of the vehicle 22 is relevant, for example, when evaluating what scan program to employ as some vehicle insurers will not authorize or pay for an OE scan program 53*b* to be run on vehicles that are older than a certain year and/or a repair facility may elect not to run an OE scan program 53*b* on vehicles older than a pre-configured year.

Safety system inputs 29 are provided to diagnostic tool 28 to identify the safety systems equipped on the vehicle, including ADAS systems on vehicle 22. It should be appreciated that different vehicles may be equipped with different ECUs, including that some vehicles of the same make/model may have different or additional ECUs when compared to other vehicles of the same make/model. For example, a given vehicle may be sold with or without various advanced driver-assistance systems (ADAS), such as adaptive cruise control, lane departure warning, parking assistance, blind spot detection, collision avoidance, forward collision warning, surround view, automatic parking, and other driver assistance systems or other vehicle options. Each ADAS subsystem may include its own additional ECUs, or an ECU may be shared for more than one ADAS feature, where such additional ECUs must be queried/scanned, accessed, and then assessed. Interfacing and interrogation with every ECU of a vehicle allows all fault codes to be ascertained. It should be appreciated that vehicles with the additional ADAS subsystems and corresponding additional ECUs may require a more extensive scanning program that is capable of interfacing with the additional ECUs of the equipped ADAS subsystems, such as, for example, an OE scan program. Correspondingly, the same vehicle make and model without additional ADAS subsystems will not have the additional ECUs, whereby an aftermarket scan program may be acceptable. In accordance with aspects of the present invention, therefore, prior to providing a mechanic 24 with a recommendation or suggestion of a diagnostic scan application program to use, an evaluation may be performed to determine the vehicle systems present on the subject vehicle whereby a scan program may be recommended, including based on the particular systems/ECUs present on the vehicle and/or any particular damage that occurred to vehicle 22, such as from a collision. Still further, in order to certify compliance with repair procedures, such as part of an OE certification program or by mandates of an insurer, it may be necessary to run an OE scan.

Safety system inputs 29 may be obtained in a number of ways. In one configuration, diagnostic tool 28 includes a diagnostic evaluation program application 51 (FIG. 3) for querying/scanning the vehicle 22 to read vehicle data information regarding the particular ECUs that are present on the vehicle, with the vehicle data information being analyzed or parsed to determine the particular vehicle systems provided on the vehicle based on the particular ECUs that are detected. In particular, system 10 determines whether vehicle 22 includes particular safety systems, such as any ADAS systems based on the particular ECUs that are detected. Accordingly, prior to selecting a diagnostic scanning program 53*a*, 53*b* for use with a given vehicle, a diagnostic evaluation program 51 may initially be run to read or obtain vehicle data information related to the equipped vehicle systems on the vehicle. In one embodiment, vehicle diagnostic tool 28 includes a database 50*b* that includes known ECUs that may be present on a vehicle, including ECUs for ADAS systems on a vehicle. Diagnostic evaluation program 51 is run to determine the ECUs that are present on the vehicle 22, where the detected ECUs may be compared to the known ECUs identified in database 50*b* that may be present, whereby the particular ECUs present on vehicle 22 may be identified. In one embodiment, information contained within database 50*b* includes information regarding addresses within electrical system 23 for the potential ECUs of vehicle 22, where the addresses may be specified, for example, by a bit string, such as unique bit strings for the various addresses of the ECUs. For example, database 50*b* may include information regarding each possible ECU that was available for a given make and model of vehicle, such as by year, including for all potential options, including ADAS systems, including the specific ECU for each possible module and the address within electrical system 23 that such ECU is located. Diagnostic evaluation program 51 may operate to query each address of electrical system 23 at which an ECU may be present, such as by sending an inquiry signal to such addresses, where system 10 is able to confirm the presence of a given ECU for such addresses if a response signal is received from an ECU at the given address. Moreover, system 10 is able to identify the particular ECU, including whether the ECU is an ADAS ECU based on the address, which identification information may be stored in database 50*b* along with the given address. For example, each potential ECU of a given make and model of vehicle, including by year or years, may be mapped out such that database 50*b* includes the address of each ECU, and may also include the specific operation, purpose or function of the ECU, such as by part number, name, or the like. System 10 may serially query addresses of electrical system 23 to determine the presence of particular ECUs, including ADAS ECUs, or may alternatively broadcast inquiry signals to multiple or all potential addresses in parallel. Still further, rather than query each ECU within the electronic system 23, system 10 may be configured to query only for ADAS ECUs. In such a configuration database 50*b* may only contain ECU addresses for ADAS systems.

In an alternative configuration or operation, system 10 may obtain safety system inputs 29 by determining the ADAS systems present on vehicle 22 by way of build data from the vehicle database 50*b* that comprises a VIN database. For example, the diagnostic evaluation program 51 may obtain the vehicle VIN upon connection of system 10 with vehicle 22. As a first step, system 10 via the vehicle diagnostic tool 28 may initially acquire a vehicle identification number (VIN) associated with a vehicle under test. In an aspect of the present invention, the diagnostic tool 28 is operable to read the VIN from the vehicle 22 via its connection through the OBD2 diagnostic port 32. The vehicle VIN may then be used to determine the vehicle systems equipped on the vehicle, such as via VIN database 50*b*, where for example, computer module 30 may include database 50*b* that is operatively used to determine the vehicle systems on the vehicle based on the determined VIN. This may include an algorithmic lookup table based on the identified VIN, such as for example where certain alphanumeric characters of the VIN identify the presence or absence of particular vehicle systems present on the vehicle, such as ADAS systems or other vehicle or safety systems. In response to the identification of the vehicle systems an appropriate diagnostic scanning program 53*a*, 53*b* may be selected for use in scanning the electrical system of the vehicle. Alternatively, the VIN for the vehicle 22 may be acquired through alternative means and directly input by the operator 24, such as by being visually examined and input via interface 66, such as by way of a keyboard or touch screen. Moreover, rather than a lookup VIN database, the system 20 may operatively algorithmically analyze selected alphanumerical characters, such as by position number in the VIN, with the system 20 recognizing based on the particular character and location the presence or absence of particular vehicle systems present on the vehicle, such as being preprogrammed. This may include, for example, an operator initially entering a make and model of a vehicle via interface 66 whereby the system 20 is preconfigured to read particular characters in particular locations of the VIN in order to determine the presence or absence of particular vehicle systems present on the vehicle.

Figure 3A:
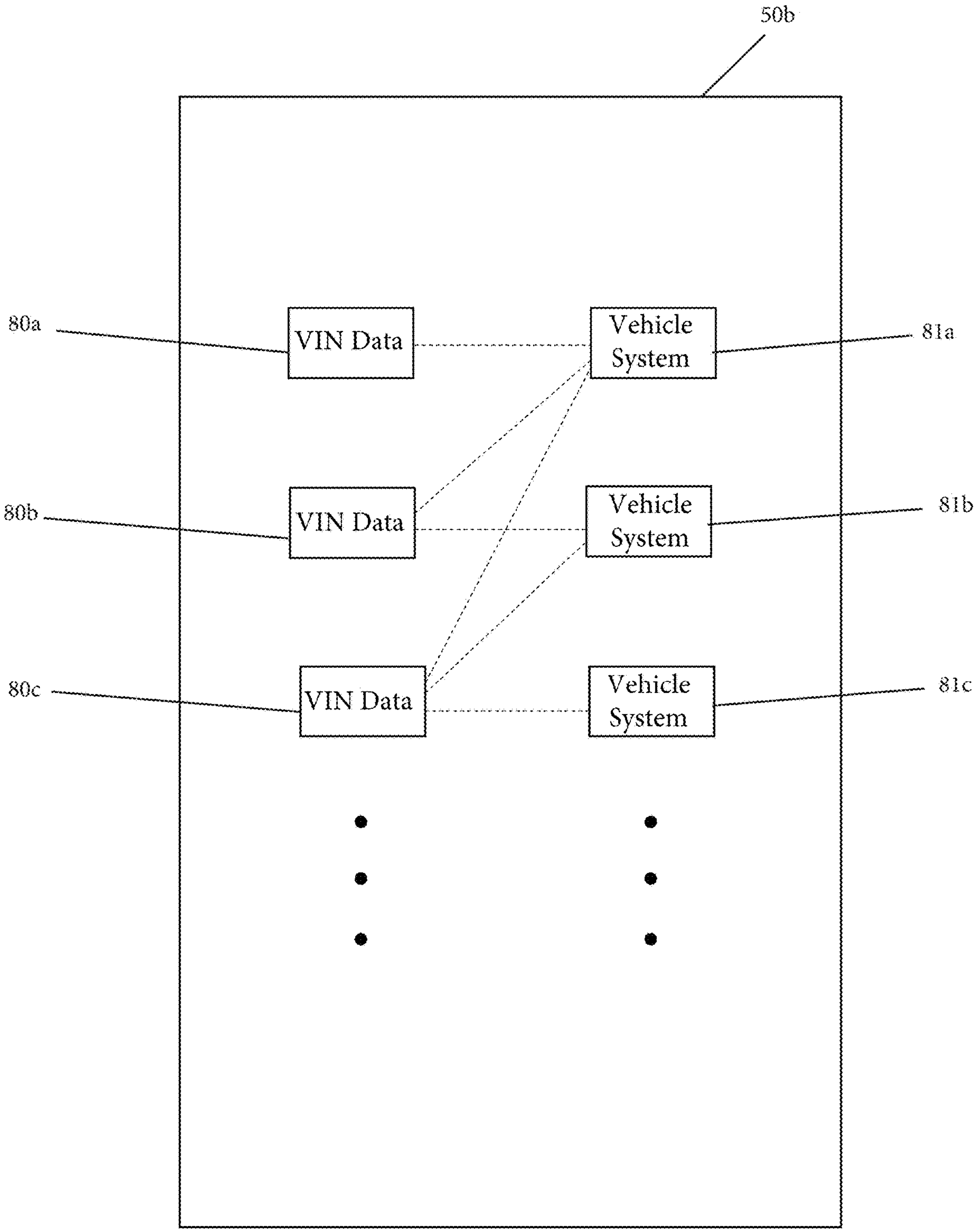
FIG. 3A discloses an exemplary database correlating vehicle identification number data to vehicle systems for a vehicle.

An exemplary embodiment of a database 50*b* configured as a VIN database is illustrated in FIG. 3A, such as for one particular make and model of vehicle. As there shown, database 50*b* includes a listing of VIN data 80*a*, 80*b*, 80*c*, where VIN data may comprise complete VIN numbers, ranges of VIN numbers, or selected portions or ranges of VIN numbers for a given make and model vehicle, with the VIN data 80*a*, 80*b*, 80*c* being correlated with vehicle systems 81*a*, 81*b*, 81*c*, where the vehicle systems 81*a*, 81*b*, 81*c* in the illustrated embodiment are ADAS systems such as a forward facing lane keeping assist system, an adaptive cruise control system, and a collision avoidance system. It should be appreciated that although database 50*b* is illustrated in FIG. 3A to include three separate VIN data designations and three separate vehicle systems, that in practice the VIN database may include numerous listings of VIN data as well as numerous vehicle systems. The vehicle database 50*b* may further comprise a VIN/ECU part number database that includes a listing of ECU part numbers associated with a given VIN. Accordingly, selection of a diagnostic scan program may be based in part upon a review of the VIN database and a review of the ECU part numbers associated with the current vehicle's VIN.

Still further, safety system inputs 29 comprising the ADAS systems present on a vehicle may be obtained by way of vehicle database 50*b* based on the year, make and model of a vehicle 22. In such a configuration the vehicle database 50*b* may identify the possible ADAS systems on vehicle 22 based on the year, make and model of vehicle 22. As noted above, this may be acquired via diagnostic tool 28 reading the electronic system 23, or may be entered by the mechanic 24, such as via screen 66*a*.

System 10 provides a recommendation or suggestion to mechanic 24 as to which diagnostic scan program to run on vehicle 22 based in part on the determined ADAS systems and associated ECUs that are present on vehicle 22. It should be appreciated, however, that in the step of determining the presence of the particular ECUs on the vehicle 22, that the absence of a response signal from an ECU at a given address, such as an ADAS ECU, may mean either that the module and ECU was not present on the vehicle, i.e. it was not originally equipped with the ADAS module and associated ECUs, or that the module having such ECU has been damaged. For example, in the case of a vehicle that has been damaged, such as by a collision, it is possible that the vehicle may have been equipped with particular vehicle systems or modules having ECUs, such as ADAS ECUs, but that due to the damage to the vehicle the diagnostic evaluation program 51 may not be able to detect all of the ECUs due to the vehicle damage. For example, a vehicle may be equipped with certain exterior cameras, radar or ultrasonic sensors, or other ADAS equipment. If such components are damaged in a collision, and or associated controllers are damaged in a collision, then diagnostic evaluation program 51 may inadvertently infer that such systems were not present on vehicle when instead they are not responding or detectable due to the damage. As such, in accordance with a further aspect of the present invention, scan selection inputs 21 of system 10 may additionally include inputs 35 related to damaged areas of vehicle 22 whereby system 10 takes into consideration the damage and the potentially effected vehicle systems and associated ECUS, including ADAS systems and associated ADAS ECUs when providing a recommendation or suggestion of what diagnostic scan program to run. With reference to FIG. 1, damage information inputs are noted at 35 in FIG. 1 as one of the scan selection inputs 21.

Damage information inputs 35 may be provided to system 10 via one or more various sources. In one configuration, one or more images representative of the particular vehicle 22 being diagnosed may be shown on screen **66*a* of diagnostic tool 28 where, for example, based on a detected VIN, diagnostic tool 28 may display an image representative of the make, model and year of vehicle 22. The mechanic 24 may then be prompted to interact with the displayed image, such as with screen 66*a* being configured as a touchscreen, to designate or highlight on the displayed image the location or locations corresponding to any actual damage on vehicle 22. Alternatively, in another configuration system 10 may obtain digital images or photographs of the actual vehicle 22 requiring repair and, via image recognition software, determine the location or locations of damage on vehicle 22. Such digital images may be provided to system 10 from a separate camera, or for example, diagnostic tool 28 may include an integrated camera or imager, such as a CMOS imager, with which to take digital images of vehicle 22, with image recognition software residing in computer module 30, such as in memory 50. Still further, in yet another configuration system 10 may interface with a collision estimating software program, such as via an API exchange, whereby system 10 may receive a predetermined evaluation of any damage to vehicle 22, including to specific vehicle systems whereby the damaged ADAS modules are determined. For example, information regarding physical damage to a vehicle via is illustrated as being provided to diagnostic tool 28 from a collision estimating software residing on a separate computer 65 in FIG. 1. It should be appreciated that the collision estimating software may alternatively reside on diagnostic tool 28 itself, or be accessed directly via diagnostic tool 28**.

As also understood from FIG. 1, an additional scan selection input 21 comprises restraint deployment inputs 31. Restraint deployment inputs 31 include an identification of whether or not one or more of the vehicle airbags have been deployed, which may be entered by a mechanic 24 into diagnostic tool 28 by way of a visual inspection of vehicle 22, with diagnostic tool 28 providing a prompt to direct and allow entry of a response by mechanic 24. Alternatively, diagnostic tool 28 may be used to perform or run a pre-scan diagnostic application program, which may be a limited pre-scan, that determines if any trouble codes for the vehicle airbags are detected indicating that airbags on vehicle 22 have been deployed. The restraint deployment inputs 31 may additionally include an identification of whether or not one or more of a seat belt tensioner or pretensioner has been activated or deployed. For example, some vehicles include electronic seat belt pretensioners that utilize an explosive charge and include an ECU for providing tension to a seatbelt in the event a collision is detected. Accordingly, in like manner to determining deployment of airbags, deployment of seatbelt pretensioner restraints may be determined by visual inspection by mechanic 24 and entry into diagnostic tool 28, or by use of diagnostic tool 28 to perform a pre-scan to detect trouble codes indicating deployment of the seatbelt pretensioner system.

As noted above and shown in FIG. 1 as well as FIG. 1A, yet additional scan selection inputs 21 comprise configuration inputs 33. Configuration inputs 33 may include facility configuration inputs **33*a*, such as whether the repair facility using diagnostic tool 28 is OE certified for working on a given vehicle make. A repair facility or mechanic 24 may designate the OEM vehicle manufacturers for which the repair facility is certified. This may be by way of entry of information by check boxes on input screen 66*a* via scan evaluation program 43. The facility configuration inputs 33*a* may also include insurance configuration inputs, such as identification of the insurers or insurance companies with which a repair facility is authorized to work, the repair parameters mandated by the insurance company, and include identification of whether the insurer authorizes invoicing for use of an aftermarket diagnostic scan program 53*a***.

Additional configuration inputs 33 include user configurable scanning override configuration inputs **33*b* that comprise particular parameters selectable by the repair facility or mechanic 24 regarding conditions under which the recommendation of use of an aftermarket diagnostic scan program 53*a* or OE diagnostic scan program 53*b* may apply or be overridden. For example, a repair facility may endeavor to utilize an aftermarket scan program 53*a* when possible due to the savings in time and costs. Accordingly, diagnostic tool 28 may be configured by way of scan selection program 43 to suggest to mechanic 24 use of the aftermarket scan program 53*a*, such as based on the year of the vehicle or based on the determined accuracy of the aftermarket scan program 53*a***.

FIG. 1A represents various scanning override configuration inputs **33*b* in accordance with the illustrated embodiment. As there shown, system 10 via scan evaluation program 43 may be configured to suggest use of an OE scan program 53*b* under certain or parameters shown as (i) the repair facility is OEM certified for the vehicle 22 at issue, (ii) the vehicle 22 at issue includes an ADAS system that is or may have been damaged, and (iii) any vehicle restraints have been deployed on the vehicle 22 at issue. Various settings, shown as (a)-(d), in FIG. 1A for each parameter (i)-(iii) are then available to be configured by a user of diagnostic tool 28, where the settings are directed to providing a particular recommendation of use of either the aftermarket scan program 53***a* or the OE scan program 53*b* under certain specified conditions.

As further understood from FIG. 1A, in the case of (i) the repair facility being OEM certified for the vehicle 22 at issue, the scan evaluation program 43 may further be configured by the supplier of the program 43 or the user of the tool 28 and program 43 at the repair facility to select or configure tool 28 to (a) not suggest use of OE scan program 53*b* under any circumstances, (b) suggest use of OE scan program 53*b* for pre-scan, (c) suggest use of OE scan program 53*b* for post-scan, or (d) suggest use of OE scan program 53*b* for both pre- and post-scan operations. Likewise, as also shown in FIG. 1A, in the case of (ii) the vehicle 22 at issue including an ADAS system that is or may have been damaged, the scan evaluation program 43 may further be configured by the supplier of the program 43 or the repair facility to (a) not suggest use of OE scan program 53*b* under any circumstances, (b) suggest use of OE scan program 53*b* for pre-scan if there is ADAS system damage, (c) suggest use of OE scan program 53*b* for post-scan if there is ADAS system damage, or (d) suggest use of OE scan program 53*b* for both pre- and post-scan operations if ADAS system damage. FIG. 1A further illustrates that in the case of (iii) vehicle restraints having been deployed on the vehicle 22 at issue, the scan evaluation program 43 may further be configured by the supplier of the program 43 or the repair facility to (a) not suggest use of OE scan program 53*b* under any circumstances, (b) suggest use of OE scan program 53*b* for pre-scan if there has been deployment of a vehicle restraint, (c) suggest use of OE scan program 53*b* for post-scan if there has been deployment of a vehicle restraint, or (d) suggest use of OE scan program 53*b* for both pre- and post-scan operations if there has been deployment of a vehicle restraint.

As further understood from FIG. 1A, system 10 via scan evaluation program 43 may be configured to override an otherwise suggested use of an OE scan program 53*b* and instead suggest use of an aftermarket scan program 53*a* under the parameter shown as (iv) the vehicle 22 at issue is older than a particular model year, which model year parameter may be selectively set by the repair facility or mechanic 24. As shown, the scan evaluation program 43 may further be configured by the supplier of the program 43 or the repair facility via the settings shown as (a)-(d) to recommend use of either the aftermarket scan program 53*a* or the OE scan program 53*b* under certain specified conditions, including to (a) not override the suggested use based on vehicle model year under any circumstances, (b) override a suggested use of OE scan program 53*b* for pre-scan to instead use aftermarket scan program 53*a* if the vehicle is older than a preselected model year, (c) override a suggested use of OE scan program 53*b* for post-scan to instead use aftermarket scan program 53*a* if the vehicle is older than a preselected model year, or (d) override a suggested use of OE scan program 53*b* for both pre- and post-scan to instead use aftermarket scan program 53*a* if the vehicle is older than a preselected model year.

FIG. 1A further illustrates that system 10 via scan evaluation program 43 may be configured to override an otherwise suggested use of an OE scan program 53*b* and instead suggest use of an aftermarket scan program 53*a* under the parameter shown as (v) the aftermarket scan program 53*a* is determined to be a fully accurate match to the scope of the OE scan program 53*b*. For example, by historical comparisons of use of both a given aftermarket scan program 53*a* and OE scan program 53*b* on particular makes, models and years of vehicles, a determination can be made as to the coverage of the aftermarket scan program 53*a* relative to the OE scan program 53*b*. That is, the determination is whether the aftermarket scan program 53*a* is a full, complete or one hundred percent match to the scan of the OE scan program 53*b* so as to represent a full or complete scan of the electronic system 23 of vehicle 22 in like manner as would be provided by an OE scan program 53*b*, such as with regard to scanning all electronic systems of the vehicle, including ADAS systems and associated ECUs. If such a determination is made, there can be a sufficiently high degree of confidence that use of the aftermarket scan program 53*a* is acceptable to use in place of the OE scan program 53*b*. This determination can be made, for example, by repeatedly running both an aftermarket scan program 53*a* and an OE scan program 53*b* as post-scans on various vehicles and comparing the results. Information regarding the accuracy of the aftermarket scan program relative to the OE scan program may then be provided as an additional configuration input 33, such as shown in FIG. 1 as aftermarket scan accuracy configuration inputs 33*c*. It should be appreciated that use of aftermarket scan program 53*a* may be desirable when determined to be sufficiently accurate relative to the OE scan program 53*b* in view of both the longer time duration to run the OE scan program 53*b*, such as due to various initialization and post processing steps, as well as the higher usage cost, such as higher per usage fees of the OE scan program 53*b*.

Accordingly, as shown in FIG. 1A, in the case where (v) the aftermarket scan program 53*a* is determined to be a fully accurate match to the scope of the OE scan program 53*b*, the scan evaluation program 43 may further be configured by the supplier of the program 43 or the repair facility to via the settings shown as (a)-(e) to recommend use of either the aftermarket scan program 53*a* or the OE scan program 53*b* under certain specified conditions, including to (a) not override the suggested use based on the accuracy of the aftermarket scan 53*a* under any circumstances, (b) override a suggested use of OE scan program 53*b* for pre-scan to instead use aftermarket scan program 53*a* if the aftermarket scan program 53*a* is determined to be a fully accurate match to the scope of the OE scan program 53*b*, (c) override a suggested use of OE scan program 53*b* for post-scan to instead use aftermarket scan program 53*a* if the aftermarket scan program 53*a* is determined to be a fully accurate match to the scope of the OE scan program 53*b*, or (d) override a suggested use of OE scan program 53*b* for both pre- and post-scan to instead use aftermarket scan program 53*a* if the aftermarket scan program 53*a* is determined to be a fully accurate match to the scope of the OE scan program 53*b*, and (c) override a suggested use of OE scan program 53*b*, but defer to OEM certification requirements.

It should be appreciated that the various parameters (i)-(v) are effectively binary in the illustrated embodiment—i.e, the repair facility either is or is not certified for a given OEM, or there either is or is not damage in an ADAS area, or vehicle restraints either have or have not been deployed, or the system 10 can either be configured or not configured for overriding based on a selectable model year, or the aftermarket scan program 53*a* either is or is not sufficiently accurate to the OE scan program 53*b*, where the accuracy may be selectable, such as one-hundred percent accurate. It should be appreciated that the various settings (a)-(e) noted above with respect to the parameters (i)-(v) may be selectable by a user via diagnostic tool 28, and in particular may be set within diagnostic tool 28, such as by the provider of diagnostic tool 28 or the owner or operator or manager of the repair facility, whereby these are pre-configured for use by a mechanic 24 when diagnosing a vehicle 22. In this way, a repair facility may uniformly service vehicles in a predetermined manner. An owner or operator or manager of a repair facility 11, as well as an operator or mechanic 24 may be referred to as a user of diagnostic tool 28.

Configuration inputs 33 may additionally include OE certification requirement configuration inputs 33*d*, such as may be entered or configured by the supplier of the program 43 or the user of the tool 28 and program 43 at the repair facility to select or configure tool 28. For example, OEM vehicle manufacturers establish certain criteria mandating the manner in which vehicles may be repaired as part of the OE certification, which can include requiring use of OE diagnostic scan application program 53*b* for a pre-scan and/or a post-scan in certain conditions. For example, running of an OE diagnostic scan program 53*b* as a post-scan operation may be required to confirm that repairs were properly made in order for the repair facility to maintain its OE certification, which may be audited by the OE to insure compliance by the repair facility. Accordingly, system 10 may incorporate specific certification positions for the particular OEM within the scan evaluation program 43. For example, as shown in FIG. 1A, if the OEM requires an OE diagnostic scan program 53*b* to be run as a pre-scan or a post-scan. In a preferred embodiment this requirement is set by the supplier of diagnostic tool 20 and scan evaluation program 43, where program 43 may be periodically be updated to account for any changes to requirements by OEMs.

Configuration inputs 33 may additionally include a selectively set age override configuration input 33*e* where the scan evaluation program 43 may further be configured by the supplier of the program 43 or the user of the tool 28 and program 43 at the repair facility to select or configure tool 28 to override selection of an OE diagnostic scan program 53*b* if the vehicle 22 under test is older than a certain preset model year. For example, an entry into tool 28 may be made by which model year 2014 is entered as the age override configuration input 33*c*, whereby vehicles of model year 2014 or older are directed to use of aftermarket scan program 53*a*.

The various configuration inputs 33 discussed above may be entered into system 10, such as into diagnostic tool 28 via scan evaluation program 43, by way of check boxes or data entry boxes on screen 66*a* of diagnostic tool 28, including to drive system 10 to suggest a particular scanning program based on the inputs 33*b*. Still further, various configuration inputs 33 may be initially preconfigured into diagnostic tool 28 by the supplier of tool 28 and program 43, such as being setup for use in a given repair facility, and/or may be configurable by the purchaser or user of tool 28 and program 43.

Figure 4A:
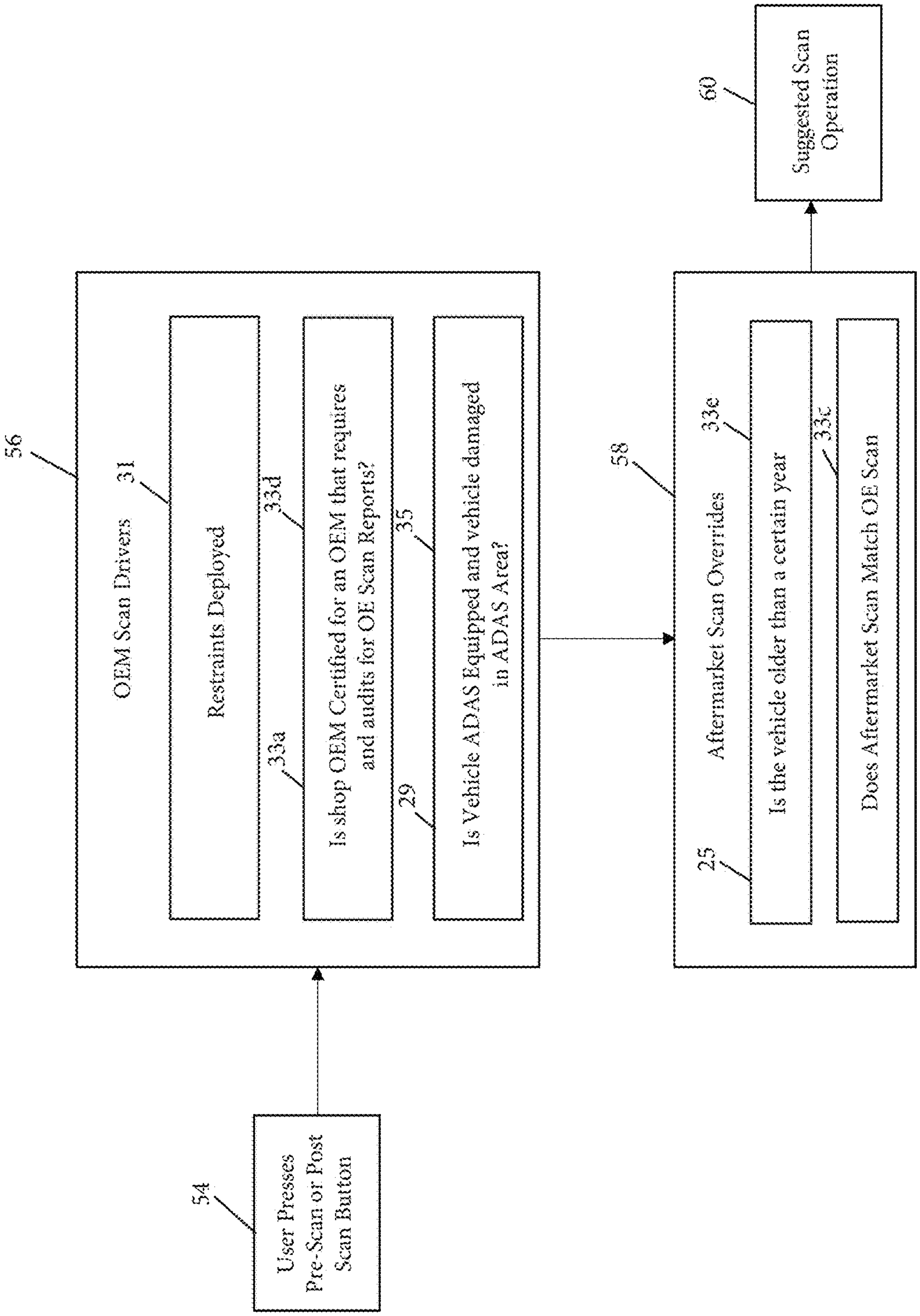
FIG. 4A is an overview illustration of the process by which the diagnostic tool of FIG. 1 provides a recommendation based on the indicated inputs.

FIG. 4A illustrates the general process of use of scan evaluation program 43 to suggest a diagnostic scan program based on scan selection inputs 21 in accordance with aspects of the present invention. As indicated at 54, a user of diagnostic tool 28 with scan evaluation program 43, such as mechanic 24, initially indicates whether a pre-scan or post-scan procedure is to be performed, such as by way of a button on screen 66*a*. FIG. 4A illustrates at 56 selected factors that would drive scan evaluation program 43 toward suggesting use of OE scan program 53*b*, including whether restraints are deployed, as determined per restraint deployment input 31, whether the repair facility is OEM certified for the vehicle 22 under test and whether the OEM requires use of OE scan programs, per configuration inputs 33*a* and 33*d*, and whether the vehicle 22 is equipped with ADAS systems and whether there the vehicle is damaged in an area in which an ADAS system is located, per safety system input 29 and damage input 35. FIG. 4A further illustrates at 58 selected factors considered via scan evaluation program 43 to override use of an OE scan program 53*b* and instead suggest to mechanic 24 use of an aftermarket scan program 53*a*, including the age of the vehicle 22 under test, per configuration vehicle detail inputs 25 relative to age override configuration input 33*e*, and whether the aftermarket scan program 53*a* for the vehicle 22 is determined to be a sufficient match to the OE scan program 53*b*, per configuration input 33*c*. As understood at step 60 in FIG. 4A, diagnostic tool 28 will then display on screen 66*a* the suggested diagnostic scan program to use for the vehicle.

Figure 4B:
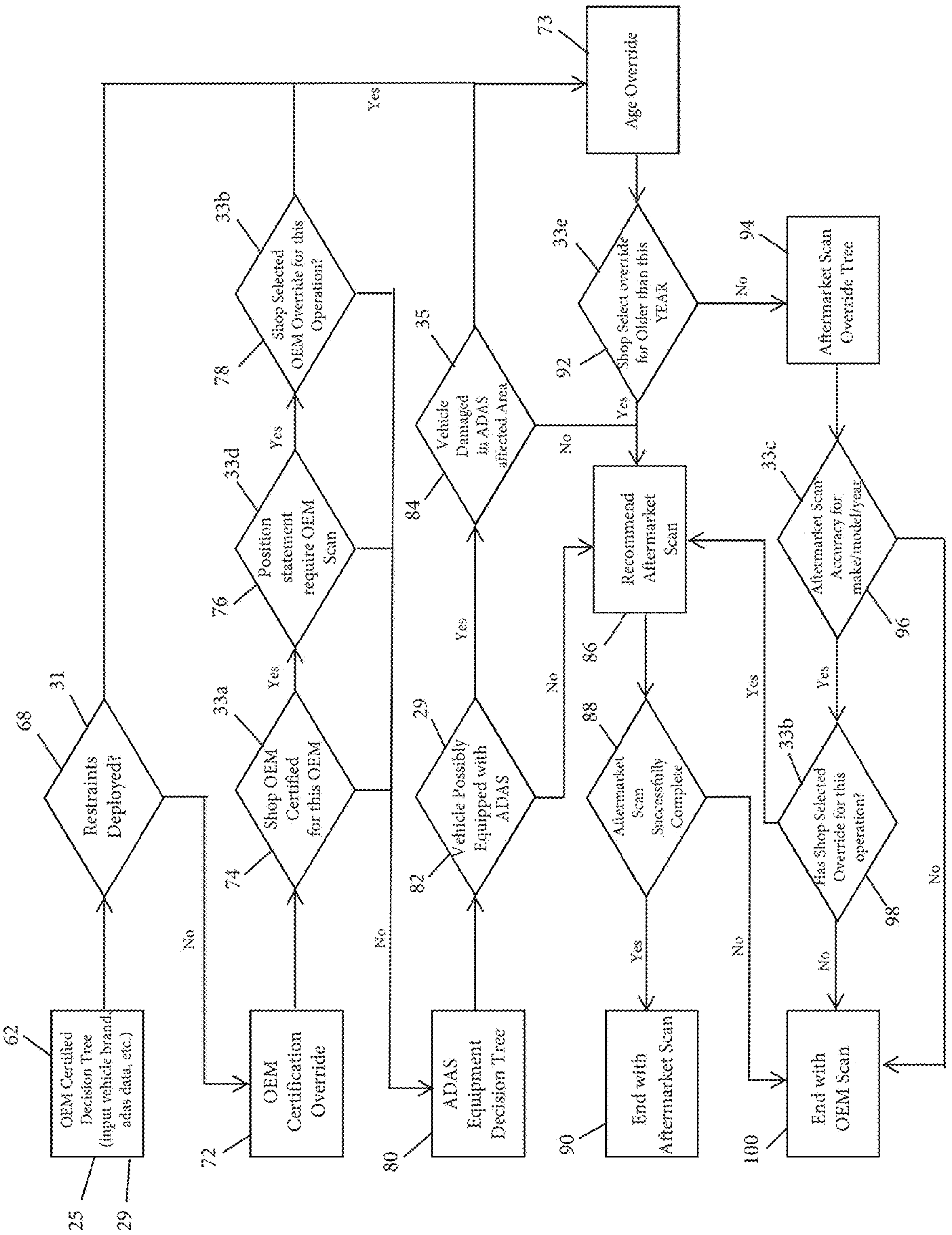
FIG. 4B is a detailed flow chart illustrating aspects of the vehicle diagnostic method in accordance with the present invention by which diagnostic tool provides a diagnostic scanning program recommendation to an operator.

Referring now to FIG. 4B, an exemplary detailed process of use of diagnostic tool 28 and scan evaluation program 43 to suggest and use an aftermarket diagnostic scan program 53*a* or OE diagnostic scan program 53*b* is illustrated, such as in the process of conducting a pre-scan or a post-scan. As shown at step 62, some or all of the various scan selection inputs 21 are provided to tool 28, including in particular the vehicle detail inputs 25 and safety system inputs 29 regarding the vehicle 22 under test. It should be appreciated that certain of the scan selection inputs 21 may be entered and retained within memory 50 and not require re-entry each time tool 28 is used, such as the facility configuration inputs 33*a* and scan override configuration inputs 33*b*. Moreover, it should be further appreciated that various scan selection inputs 21 may be entered initially together, or may be separately entered serially, such as during the process of use and operation of scan evaluation program 43.

As illustrated at step 68 in FIG. 4B, an evaluation of whether or not restraints are deployed on vehicle 22 is initially made via restraint deployment inputs 31 discussed above. In the embodiment of FIG. 4B, if vehicle restraints have not been deployed, diagnostic tool 28 via scan evaluation program 43 proceeds to an OE certification override step or branch 72 that, as shown, guides the diagnostic scan program recommendation in view of various inputs. As shown at step 74, guidance is provided based on whether the repair facility is OE certified for the vehicle 22 under test based on the facility configuration input 33*a*. At step 76 guidance is provided based on whether the OEM certification requires use of an OE scan program under particular conditions, as set forth at requirement configuration inputs 33*c*. And at step 78 guidance is provided based on the scanning override configuration inputs 33*b*. If any of steps 74, 76 or 78 based on the indicated inputs result in a "no" outcome or condition, diagnostic tool 28 via scan evaluation program proceeds to an ADAS equipment decision step or tree 80 that, as also shown, guides the diagnostic scan program recommendation in view of various additional inputs.

As shown at step 82 guidance is provided based on whether the vehicle 22 includes ADAS systems based on the safety system inputs 29. In turn, at step 84 guidance is provided based on whether vehicle 22 includes any damage in ADAS affected areas based on damage inputs 35. As shown at step 86, if either of steps 82 or 84 based on the indicated inputs result in a "no" outcome, diagnostic tool 28 via scan evaluation program 43 recommends use of the aftermarket scan program 53*a*. FIG. 4B further illustrates that at step 88 an evaluation is made as to whether the aftermarket scan program 53*a* successfully completed the diagnostic scan of the electronic system 23 of vehicle 22, where this evaluation is an electronic evaluation performed internally of diagnostic tool 28 based on detecting a successful completion of the running of scan program. If so, as indicated at step 90, the scan is complete based on the running of aftermarket scan program 53*a*. If, however, at step 88 the aftermarket scan program 53*a* is not successfully completed, diagnostic tool 28 via scan evaluation program 43 proceeds to step 100 to recommend use of the OE scan program 53*b*.

The embodiment of FIG. 4B further illustrates that diagnostic tool 28 via scan evaluation program 43 proceeds to a vehicle age override step or branch 73 under a number of scenarios. This includes if at step 68 the restraint deployment inputs 31 reveal that a restraint has been deployed, or if in the OE certification override step or branch 72 if each of steps 74, 76 and 78 result in a "yes" outcome or condition based on their associated inputs 33*a*, 33*d*, 33*b*, or if in the ADAS equipment decision step or tree 80 if each of steps 82 and 84 result in a "yes" outcome or condition based on their associated inputs 29, 35.

In the vehicle age override step or branch 73, as shown at step 92, guidance is provided based on the age override configuration input 33*e* as to whether the repair facility has designated to override an OE scan recommendation based on the model year of the vehicle 22 under test. As shown, if a "yes" outcome or condition is obtained, the process proceeds to previously discussed step 86 in which diagnostic tool 28 via scan evaluation program 43 recommends use of the aftermarket scan program 53*a*.

If, however, a "no" outcome or condition is obtained at step 92, diagnostic tool 28 via scan evaluation program 43 proceeds to an aftermarket override step or tree 94 that, as shown at step 96, guides the diagnostic scan program recommendation in view of additional inputs, including the aftermarket scan accuracy configuration input 33*c* of the given aftermarket scan program 53*a* for the vehicle 22 at step 96 and based on the scanning override configuration inputs 33*b* at step 98. If at step 96 the aftermarket scan accuracy configuration input 33*c* indicates that the aftermarket scan program 53*a* for the vehicle 22 is not sufficiently accurate, then diagnostic tool 28 via scan evaluation program 43 proceeds to step 100 and recommends use of the OE scan program 53*b*. If, however, at step 96 the aftermarket scan accuracy configuration input 33*c* indicates that the aftermarket scan program 53*a* for the vehicle 22 is sufficiently accurate, such as being a full match to the OE scan program 53*b*, then scan evaluation program 43 continues on to step 98, where guidance is provided via program 43 based on the scanning override configuration input 33*b*, such as set by the repair facility. That is, if the repair facility has elected to override a suggestion of use of the OE scan program 53*b* when the aftermarket scan 53*a* is determined to be sufficiently accurate, then diagnostic tool 28 via scan evaluation program 43 will proceed to previously discussed step 86 in which use of the aftermarket scan program 53*a* will be recommended by diagnostic tool 28. If, however, at step 98 the repair facility via configuration input 33*b* has not elected to override a suggested use of the OE scan program 53*b* despite the accuracy of the aftermarket scan program 53*a*, then diagnostic tool 28 via scan evaluation program 43 will proceed to step 100 to recommend use of the OE scan program 53*b*.

Referring now to FIGS. 5A-5E and 6A-6E, an exemplary operation of diagnostic tool 28 using scan evaluation program 43 to provide a recommendation to use an aftermarket diagnostic scan program 53*a* (FIGS. 5A-5E) and to provide a recommendation to use an OE diagnostic scan program 53*b* (FIGS. 6A-6E).

Figures 5A, 5B, 5C, 5D, 5E:
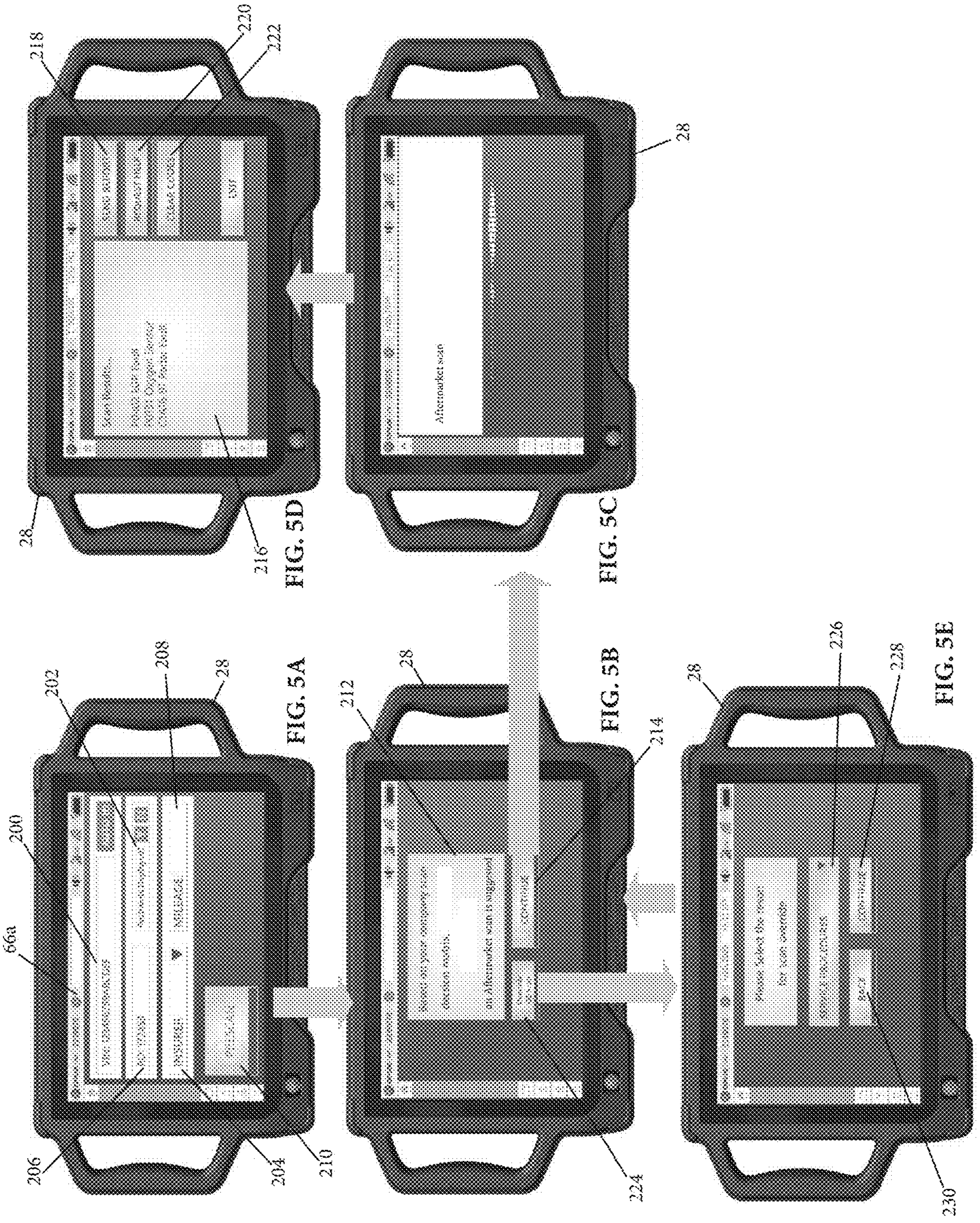
FIGS. 5A-5E and 6A-6E illustrate use of the vehicle diagnostic tool of FIG. 1 for scanning the electronic system of a vehicle in accordance with aspects of the present invention.

As shown in FIG. 5A, diagnostic tool 28 receives various scan selection inputs 21 for providing the scan program recommendation. This includes, for example, entry of vehicle data inputs 25, such as the VIN at field 200, which may be entered manually by mechanic 24 or read from the electronic system 23. FIG. 5A additionally illustrates entry of restraint deployment input 31 at field 202, which in the illustrated embodiment is entered by mechanic 24 via "yes" "no" buttons on screen 66*a*. Diagnostic tool 28 additionally receives an input regarding the insurer at field 204, such as by way of a pull down menu. Diagnostic tool 28 may also provide for entry or display of additional information, such as a repair order number at field 206 and the mileage of vehicle 22 at field 208. Mechanic 24 may additionally be able to designate whether the scan to be performed is a pre-scan or a post-scan, such as by way of a button or field 210. Various other scan selection inputs 21 may be obtained via the connection of diagnostic tool 28 with vehicle 22, preconfigured inputs 21 stored in diagnostic tool 28 that are not adjustable by mechanic 24, and/or additional entries by mechanic 24, such as on other pages displayed on screen 66*a*.

FIG. 5B illustrates that, based on the various scan selection inputs 21, scan evaluation program 43 results in a recommendation to run an aftermarket diagnostic scan program 53*a*, such as shown at field 212 and found at step 86 of FIG. 4B. Mechanic 24 may then press the continue button at field 214, which as shown in FIG. 5C will launch running of the aftermarket diagnostic scan program 53*a*. FIG. 5D shows that upon successful completion of the aftermarket diagnostic scan program 53*a*, which corresponds to step 88 in FIG. 4B, the scan results are displayed in field 216 for the mechanic 24. As also understood from FIG. 5D, via diagnostic tool 28 mechanic 24 is able to send a report of the scan results by pressing the button of field 218, where the report may be provided to a central computer for the repair facility to enable review by a manager or the like. Mechanic 24 is also able to obtain remote assistance by pressing the button of field 220, such as to obtain assistance from a remote technician at computer 64 via Internet connection 70. Mechanic 24 is also able to clear the codes in the electronic system 23 of vehicle 22 by pressing the button of field 222.

Referring again to FIG. 5B, which as noted illustrates providing a recommendation to mechanic 24 to use an aftermarket scan program 53*a* at 212, diagnostic tool 28 via scan selection program 43 additionally may allow mechanic 24 to override the recommendation. For example, as shown at field 224 an override button is provided that the mechanic 24 may push to override the recommendation provided by system 10. Upon pressing the button of field 224, the screen of FIG. 5E is presented to the mechanic 24. As shown in FIG. 5E, a pull down menu is provided at field 226 from which the mechanic 24 may select as a reason for overriding the recommendation to use aftermarket scan program 53*a*, where as shown this may include "service procedures", as well as other selectable reasons, where the reason thus comprises a reason code. Upon selecting the reason, mechanic 24 may then push the button of field 228 to proceed to using the OE diagnostic scan program 53*b* instead of the recommended aftermarket scan program 53*a*. The overriding of the suggested scan program may be logged and reported, such as to a central computer 13 of the repair facility 11, including logging the reason selected at field 226 for not following the recommendation whereby the repair facility management may review such deviations and the provided reason for not using the recommended diagnostic scan program. It should be appreciated that alternatively or in addition to the pull down menu at field 226, diagnostic tool may provide a field within which an operator may enter a reason code for not following the recommendation. As also shown, a back button is provided at field 230 to enable the mechanic 24 to return to the screen of FIG. 5B without launching the OE diagnostic scan program 53*b*.

Figures 6A, 6B, 6C, 6D, 6E:
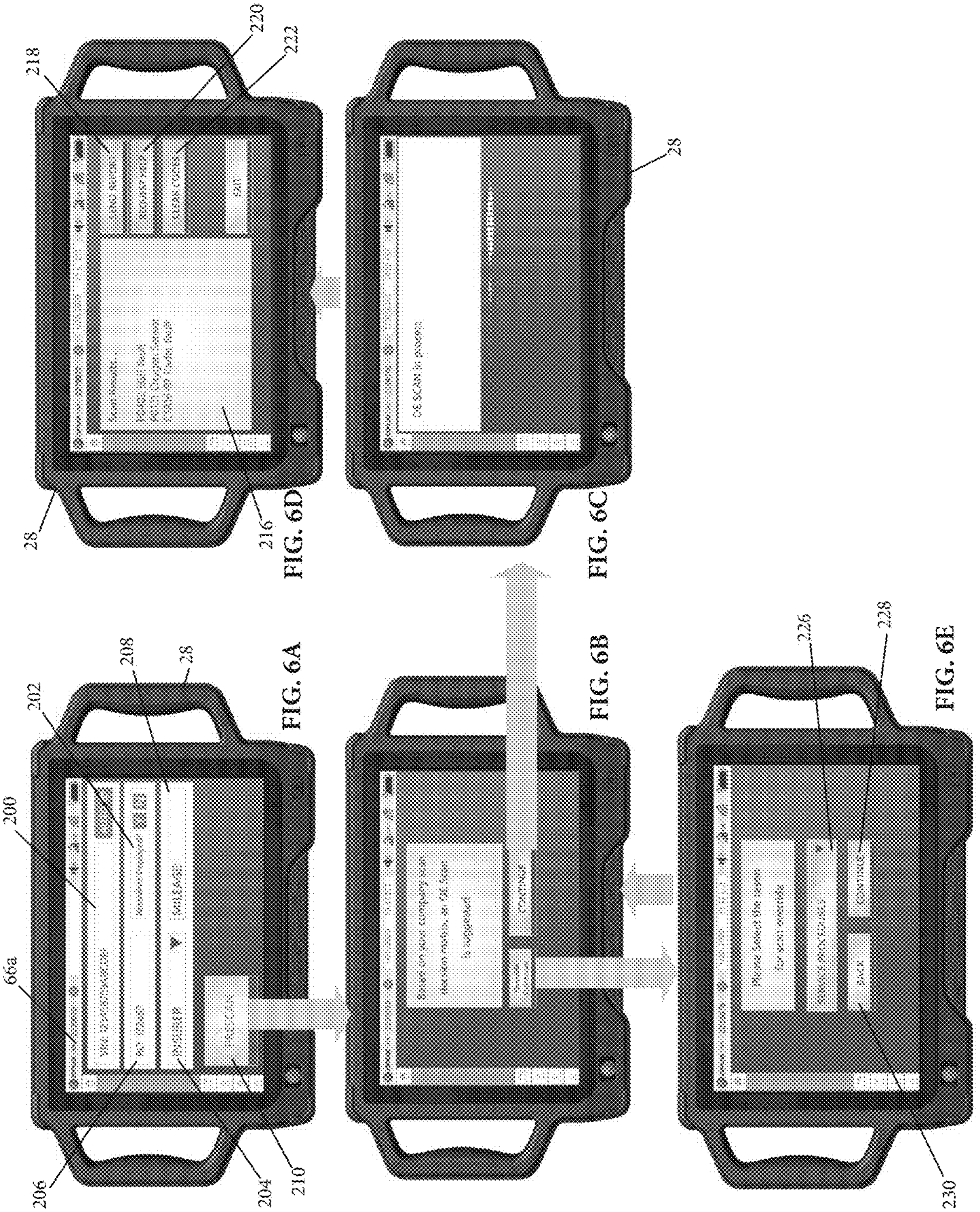

FIGS. 6A-6E illustrate a similar configuration and operation as shown in FIGS. 5A-5E, with the difference being, as understood from FIG. 6B, based on the various scan selection inputs 21, scan evaluation program 43 results in a recommendation to run an OE diagnostic scan program 53*b*, such as shown at field 212 and found at step 100 of FIG. 4B. Mechanic 24 may then press the continue button at field 214, which as shown in FIG. 6C will launch running of the OE diagnostic scan program 53*b*. Similarly, despite the recommendation to use OE diagnostic scan program 53*b*, mechanic 24 may elect to override the recommendation by pressing the override button of field 224 shown in FIG. 6B, which will take diagnostic tool 28 to the screen shown in FIG. 6E. Here again, the mechanic 24 may select or enter a reason code for doing the override from the menu of field 226, which may include additional reason codes, such as "timing" in the event that a customer does not have time to wait for an OE diagnostic scan program 53*b* to be run, or "cost" if a customer has indicated that they do not want to incur the higher cost of an OE diagnostic scan program 53*b*, where the mechanic may then initiate use of the aftermarket diagnostic scan 53*a* by pressing the button at 228. As noted above, the overriding of the suggested scan program may be logged and reported to a central computer 13 of the repair facility 11, including logging the reason selected at field 226 for not following the recommendation whereby the repair facility management may review such deviations and the provided reason for not using the recommended diagnostic scan program. The back button provided at field 230 may be used to return to the screen of FIG. 6B without launching the aftermarket diagnostic scan program 53*a*.

System 10 is additionally configured to log or record the selected diagnostic scan (either the aftermarket diagnostic scan program 53*a* or OE diagnostic scan program 53*b*) used in connection with vehicle 22, such as on computer 13, including for each vehicle repaired at facility 11, and including for pre-scans and/or post-scans, and in particular to log or record whether the selected diagnostic scan used was the recommended diagnostic scan. As noted, in the event that a mechanic 24 does not use the recommended diagnostic scan, system 10 additionally records the reason code selected or entered by the mechanic 24 for not using the recommended diagnostic scan.

System 10 may additionally employ a vehicle ADAS database 49, where database 49 includes information regarding all possible ADAS modules that may have been available for a given make, model and year of vehicle. For example, as noted above, diagnostic tool 28 may query electronic system 23 to obtain the VIN of vehicle 22, or the mechanic 24 may enter the VIN into diagnostic tool 28, such as a mechanic input 47. Alternatively, the mechanic input 47 may comprise the make, model and year of the vehicle 22 as a manual input entered by the mechanic 24. Based on the determined and decoded VIN and/or the make, model and year of the vehicle 22, database 49 is operable to determine what possible ADAS modules or systems may have been available for the vehicle 22.

In one embodiment, VIN database 37 and/or ADAS database 49 are located remotely from the vehicle repair facility and accessed by diagnostic tool 28, such as being retained within remote server 64 and accessed via a wireless Internet connection 70. Alternatively, databased 37 and 49 may be combined with database 50*b*, either remotely or locally. Likewise, scan selection program 43, diagnostic evaluation program 51, and/or diagnostic scan programs 53*a*. 53*b* may also be located remotely and be accessed by diagnostic tool 28. Alternatively, all or any of scan selection program 43, diagnostic evaluation program 51, and/or diagnostic scan programs 53*a*, 53*b* are contained within memory 50 of diagnostic tool 28, as discussed above. Still further, it should be additionally appreciated that programs 43, 51, 53*a*, 53*b* may each comprise multiple subparts or routines that operate together. It should be further appreciated that scan selection inputs 21 may be variables that are used by or entered into scan selection program 43.

In a further particular alternative embodiment, system 10 may query the electronic system 23 of the vehicle 22 to obtain the part numbers of all ECUs resident on vehicle 22, where the ECU part numbers are readable via interface module 27 and the connection with OBD diagnostic port 32.

Figure 3B:
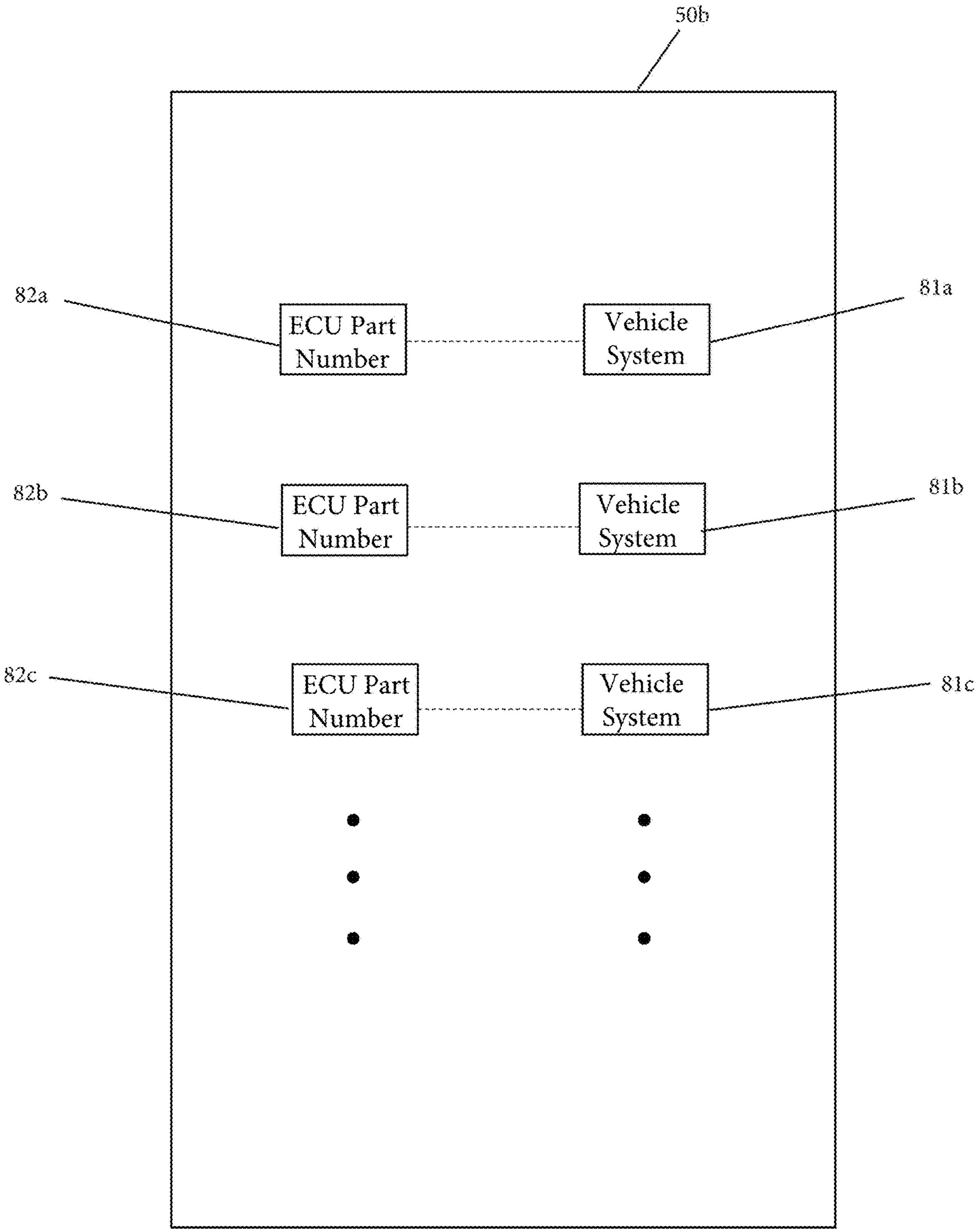
FIG. 3B discloses an exemplary database correlating vehicle identification number data to vehicle systems for a vehicle.

An exemplary embodiment of a database 50*b* configured as an ECU database is illustrated in FIG. 3B. As there shown, database 50*b* includes a listing of ECU part numbers 82*a*, 82*b*, 82*c*, such as for one particular make and model of vehicle, with the ECU part numbers being correlated with vehicle systems 81*a*, 81*b*, 81*c*, where the vehicle systems 81*a*, 81*b*, 81*c* in the illustrated embodiment are ADAS systems such as a forward facing lane keeping assist system, an adaptive cruise control system, and a collision avoidance system. It should be appreciated that although database 50*b* is illustrated in FIG. 3B to include three separate ECU part numbers associated with three separate vehicle systems, in practice a vehicle may be equipped with dozens or hundreds of ECUs where by the ECU database may include numerous listings of ECU part numbers as well as numerous vehicle systems. It should be appreciated that database 50*b* may include both ECU part numbers and addresses, which may be correlated or combined together.

The vehicle database 50*b* may further comprise a VIN/ECU part number database that includes a listing of ECU part numbers associated with a given VIN. Therefore, based upon a review of the VIN database and a review of the ECU part numbers associated with the current vehicle's VIN, a selection may be made between a third party supplied scanning program or a manufacturer supplied scanning program. For example, if the VIN database reveals that a given vehicle contains one or more ECU part numbers associated with ADAS ECUs, a decision can be made to select the more comprehensive manufacturer supplied scanning program. In the alternative, if a review of the VIN database reveals that the vehicle is not equipped with ADAS ECUs, the faster and less costly third-party supplied scanning program may be utilized. Such a decision may be aided if the VIN entry in the VIN database for an ADAS equipped vehicle includes at least one part number of an ADAS ECU associated with the VIN. Alternatively, the VIN entry in the VIN database for an ADAS equipped vehicle may include some other indication in the VIN database that the VIN is associated with an ADAS equipped vehicle. Therefore, if a vehicle's VIN entry in the VIN database does not include an ADAS ECU part number or some other indication that the VIN is for an ADAS equipped vehicle, the third-party supplied scanning program may be selected.

Still further, system 20 may be configured to accept operator input to obtain vehicle data information used to provide a recommendation for use of a diagnostic evaluation program 53*a*, 53*b* appropriate to a particular vehicle 22 under test. For example, system 10 may prompt an operator 24 to enter vehicle make and model information, such as via interface 66. System 10 may then also provide step-by-step inquiries to operator 24 regarding systems installed on vehicle 22, such as whether vehicle 22 includes particular cameras at particular locations, or specifically whether vehicle 22 has particular ADAS systems. Accordingly, system 10 instead of automatically selecting and launching a diagnostic scanning program 53*a*, 53*b* to be run after diagnostic evaluation program 51 queries vehicle electronic system 23 to determine which vehicle systems 81*a*, 81*b*, 81*c* are present on vehicle 22, or prior thereto, system 10 may instead provide a recommendation of whether to run an aftermarket diagnostic scan program 53*a* or an OE diagnostic scan program 53*b*, in particular based on various scan inputs 21.

Although database 50*b* is disclosed above as residing in diagnostic tool 28, such a database may additionally or alternatively reside in the memory of a remote computer, such as a remote server 64. If the database is located in a remote server 64, the vehicle interface tool 28 may access the database via an Internet interface. Optionally, the database, such as a database found on the remote computer or server 64, may be a compiled database of VINs and/or ECUs provided by a third party. Still further, the database found in the memory of the vehicle interface tool 28 may be a local database that comprises a portion of the information, where the database found on the remote computer or server 64 is remote and contains additional or alternative information. For example, the database may be progressively expanded to include those VINs and/or associated ECU part numbers for vehicles previously serviced at a particular service station or automotive repair business. Optionally, the database may be updated, such that an operator may add a new vehicle VIN and associated ECU part numbers. The database may thus be a tool for identifying which vehicles are equipped with ADAS subsystems.

Diagnostic tool 28 may, either in addition to the above noted various loaded diagnostic applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

System 10, in addition to performing scanning operations, may also be used for reprogramming of vehicle 22, such as reprogramming selected ECUs, including reprogramming ECUs based on a determination of particular fault codes.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle interface diagnostic tool 28 is disclosed as including both the diagnostic evaluation program 51 as well as multiple diagnostic scanning programs 53*a*, 53*b*. It should be appreciated that alternative arrangements may be employed within the scope of the present invention. For example, program 51 and/or programs 53*a*, 53*b* may reside on different devices. For example, an operator 24 may first utilize one device with a diagnostic evaluation program 51 to determine which diagnostic evaluation program is appropriate for the vehicle 22, and then select from alternative computer devices to run the determined diagnostic evaluation program. Still further, although diagnostic evaluation program 51 and diagnostic scanning programs 53*a*, 53*b* are illustrated and discussed herein as being separate programs, one or more of such programs may be combined together and operate as subroutines.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method for guiding selection of a diagnostic scan program for diagnosing an electronic system of a vehicle with a vehicle diagnostic computer tool, said method comprising:

providing a vehicle diagnostic system comprising a vehicle diagnostic computer tool and a scan evaluation program, wherein the vehicle diagnostic computer tool includes a display screen, and wherein the vehicle diagnostic computer tool is configured to be connected to a diagnostic port of the vehicle to be in communication with the electronic system of the vehicle and to operate in a mode to diagnose the vehicle;

providing a plurality of diagnostic scan programs, wherein the diagnostic scan programs comprise an aftermarket diagnostic scan program and an original equipment ("OE") diagnostic scan program, wherein the diagnostic scan programs are configured to diagnose the electronic system of the vehicle with the vehicle diagnostic computer tool;

providing scan selection inputs to the vehicle diagnostic computer tool;

generating a recommendation to use one of either the aftermarket diagnostic scan program or the OE diagnostic scan program, wherein the recommendation is displayed on the display screen of the diagnostic evaluation tool and comprises a recommended diagnostic scan program;

wherein said generating the recommendation to use one of either the aftermarket diagnostic scan program or the OE diagnostic scan program is provided by the scan evaluation program based on the scan selection inputs;

wherein the scan selection inputs comprise at least one override configuration input parameter, and wherein the override configuration input parameter comprises user selectable settings directed to suggesting either the aftermarket diagnostic scan program or the OE diagnostic scan program under particular conditions;

wherein the override configuration input parameter is directed to at least one of (i) whether the user of the diagnostic tool is OEM certified for repairing the vehicle, (ii) whether there is damage to the vehicle in the location of an Advanced Driver Assistance System (ADAS) system equipped on the vehicle, (iii) whether a vehicle restraint on the vehicle is deployed, (iv) whether the vehicle is older than a preselected model year, and (v) whether the aftermarket scan program is an accurate match to the OE scan program.

2. The method of claim 1, wherein the vehicle diagnostic computer tool is configured to enable a user of the vehicle diagnostic computer tool to accept the recommended diagnostic scan program for use in diagnosing the electronic system of the vehicle.

3. The method of claim 1, wherein the vehicle diagnostic computer tool is configured to enable a user of the vehicle diagnostic computer tool to either accept the recommended diagnostic scan program, or to select use of the other of the diagnostic scan programs, and wherein said method further comprises logging which diagnostic scan program is selected by the user for use in diagnosing the electronic system of the vehicle, and wherein if the user selects use of the other of the diagnostic scan programs said method further comprises logging a reason code provided by the user for selecting the other of the diagnostic scan programs.

4. The method of claim 1, wherein the user selectable settings are directed to suggesting either the aftermarket diagnostic scan program or the OE diagnostic scan program under particular conditions for post-scans and/or pre-scans.

5. The method of claim 1, wherein the vehicle diagnostic computer tool is configured for use at a repair facility, and wherein the scan selection inputs comprise facility configuration inputs comprising a designation of original equipment manufacturers ("OEMs") for which the repair facility is certified.

6. The method of claim 1, wherein the scan selection inputs comprise restraint deployment inputs comprising a designation of whether or not any vehicle restraints on the vehicle have been deployed.

7. The method of claim 1, wherein the scan selection inputs comprise safety system inputs comprising a designation of whether or not the vehicle is equipped with ADAS systems.

8. The method of claim 7, wherein the scan selection inputs comprise a designation of all ADAS systems equipped on the vehicle.

9. The method of claim 7, wherein the scan selection inputs comprise a vehicle identification number ("VIN") for the vehicle, and wherein the designation of whether or not the vehicle is equipped with ADAS systems is derived from the VIN.

10. The method of claim 7, wherein the scan selection inputs comprise a designation of whether the vehicle is damaged in an area in which an ADAS system is located.

11. The method of claim 1, wherein the scan selection inputs comprise vehicle detail inputs comprising a model year of the vehicle.

12. The method of claim 1, wherein the scan selection inputs comprise a designation of the accuracy of the aftermarket scan program to the OE scan program.

13. A vehicle diagnostic system for providing a recommended diagnostic scan program for diagnosing an electronic system of a vehicle, said system comprising:

a vehicle diagnostic computer tool, wherein the vehicle diagnostic computer tool includes a display screen, and wherein the vehicle diagnostic computer tool is configured to be connected to a diagnostic port of the vehicle to be in communication with the electronic system of the vehicle and to operate in a mode to diagnose the vehicle;

a plurality of diagnostic scan programs comprising an aftermarket diagnostic scan program and an original equipment ("OE") diagnostic scan program, wherein the diagnostic scan programs are configured to diagnose the electronic system of the vehicle with the vehicle diagnostic computer tool;

a scan evaluation program;

wherein said vehicle diagnostic computer tool is configured to receive scan selection inputs, and wherein said scan evaluation program is configured to display on said display screen of said vehicle diagnostic computer tool a recommendation to use either said aftermarket diagnostic scan program or said OE diagnostic scan program based on said scan selection inputs;

wherein said scan selection inputs comprise at least one override configuration input parameter, and wherein said override configuration input parameter comprises user selectable settings directed to suggesting either said aftermarket diagnostic scan program or said OE diagnostic scan program under particular conditions;

wherein said override configuration input parameter is directed to at least one of (i) whether the user of the diagnostic tool is OEM certified for repairing the vehicle, (ii) whether there is damage to the vehicle in the location of an Advanced Driver Assistance System (ADAS) system equipped on the vehicle, (iii) whether a vehicle restraint on the vehicle is deployed, (iv) whether the vehicle is older than a preselected model year, and (v) whether the aftermarket scan program is an accurate match to the OE scan program.

14. The vehicle diagnostic system of claim 13, wherein said vehicle diagnostic computer tool is configured to enable a user of said vehicle diagnostic computer tool to accept the recommendation to use either said aftermarket diagnostic scan program or said OE diagnostic scan program.

15. The vehicle diagnostic system of claim 13, wherein said user selectable settings are directed to suggesting either said aftermarket diagnostic scan program or said OE diagnostic scan program under particular conditions for post-scans and/or pre-scans.

16. The vehicle diagnostic system of claim 13, wherein said scan selection inputs comprise at least one of a designation of whether or not any vehicle restraints on the vehicle have been deployed, a model year of the vehicle, a designation of the accuracy of said aftermarket scan program to said OE scan program, and a designation of whether or not the vehicle is equipped with ADAS systems.

17. The vehicle diagnostic system of claim 16, wherein said scan selection inputs comprise a designation of whether the vehicle is damaged in an area in which an ADAS system is located.

* * * * *